US011710485B2

(12) United States Patent
Chasney

(10) Patent No.: US 11,710,485 B2
(45) Date of Patent: Jul. 25, 2023

(54) COOKING MANAGEMENT SYSTEM WITH WIRELESS VOICE ENGINE SERVER

(71) Applicant: Daring Solutions, LLC, Brentwood, TN (US)

(72) Inventor: Jeffrey Chasney, Brentwood, TN (US)

(73) Assignee: DARING SOLUTIONS, LLC, Sarasota, FL (US)

( * ) Notice: Subject to any disclaimer, the term of this patent is extended or adjusted under 35 U.S.C. 154(b) by 291 days.

(21) Appl. No.: 17/248,545

(22) Filed: Jan. 28, 2021

(65) Prior Publication Data

US 2021/0151054 A1 May 20, 2021

Related U.S. Application Data

(63) Continuation of application No. 16/165,735, filed on Oct. 19, 2018, now Pat. No. 10,943,585.

(Continued)

(51) Int. Cl.
*G10L 15/22* (2006.01)
*G06F 40/56* (2020.01)
(Continued)

(52) U.S. Cl.
CPC .............. *G10L 15/22* (2013.01); *G06F 40/56* (2020.01); *A23L 5/10* (2016.08); *G06Q 10/0633* (2013.01);
(Continued)

(58) Field of Classification Search
CPC ......... G10L 13/00; G10L 15/22; G10L 15/30; G06F 40/56; A23L 5/10; G06Q 10/06311;
(Continued)

(56) References Cited

U.S. PATENT DOCUMENTS

| 4,654,798 A | 3/1987 | Taki et al. |
| 4,897,835 A | 1/1990 | Gaskill et al. |

(Continued)

FOREIGN PATENT DOCUMENTS

JP 04077959 A * 3/1992

OTHER PUBLICATIONS

A. Tewari, R. Iyer and V. Tewari, "Design and networking considerations for FACE," 2004, First IEEE Consumer Communications and Networking Conference, 2004. CCNC 2004., pp. 471-476, doi: 10.1109/CCNC.2004.1286907 (Year: 2004).*

*Primary Examiner* — Eric Yen
(74) *Attorney, Agent, or Firm* — Holzer Patel Drennan

(57) ABSTRACT

The disclosed technology provides computer-to-wireless-voice integration methods and systems. In some implementations, the methods and systems deliver real-time voice instructions to users of required time-sensitive actions and ensure that such directives are received and a recipient effectively acts on the directives. The systems and methods include receiving a notification of an event from a terminal in a wireless active voice engine (WAVE) system, determining an active voice directive corresponding to the event with a WAVE module, converting the active voice directive into a voice event via a directive converter, and notifying a targeted recipient of the active voice directive corresponding to the event with a communications module. In some implementations, the systems and methods include sending a confirmation event via the receiver to the communications module that the active voice directive was received by the targeted recipient and communicating the active voice directive has been completed.

20 Claims, 10 Drawing Sheets

Related U.S. Application Data

(60) Provisional application No. 62/574,408, filed on Oct. 19, 2017.

(51) Int. Cl.

| | | |
|---|---|---|
| *G10L 15/30* | (2013.01) | |
| *G10L 13/00* | (2006.01) | |
| *G06Q 10/0631* | (2023.01) | |
| *G06Q 10/0633* | (2023.01) | |
| *G06Q 50/12* | (2012.01) | |
| *A23L 5/10* | (2016.01) | |

(52) U.S. Cl.
CPC .............. *G06Q 10/06311* (2013.01); *G06Q 10/063114* (2013.01); *G06Q 50/12* (2013.01); *G10L 13/00* (2013.01); *G10L 15/30* (2013.01)

(58) Field of Classification Search
CPC ....... G06Q 10/063114; G06Q 10/0633; G06Q 50/12
See application file for complete search history.

(56) References Cited

U.S. PATENT DOCUMENTS

| | | | |
|---|---|---|---|
| 5,105,423 A | 4/1992 | Tanaka et al. | |
| 5,388,147 A | 2/1995 | Grimes | |
| 5,682,421 A * | 10/1997 | Glovitz | H04M 11/002 379/88.16 |
| 5,983,200 A | 11/1999 | Slotznick | |
| 6,381,614 B1 * | 4/2002 | Barnett | G06F 16/338 708/133 |
| 6,789,067 B1 * | 9/2004 | Liebenow | G06Q 50/12 705/28 |
| 6,837,148 B1 * | 1/2005 | Deschenes | A47J 36/00 99/468 |
| 6,901,318 B1 | 5/2005 | Morronigiello et al. | |
| 7,184,849 B2 | 2/2007 | Van Den Nieuwelaar et al. | |
| 7,809,405 B1 * | 10/2010 | Rand | G08G 5/0013 455/431 |
| 8,108,236 B1 | 1/2012 | Brearley | |
| 8,136,114 B1 | 3/2012 | Gailloux et al. | |
| 9,201,868 B1 | 12/2015 | Zhang et al. | |
| 10,025,282 B1 * | 7/2018 | Wilkinson | G05B 19/042 |
| 10,146,851 B2 | 12/2018 | Tee et al. | |
| 2002/0049598 A1 | 4/2002 | Negreiro | |
| 2002/0081982 A1 | 6/2002 | Schwartz et al. | |
| 2003/0004908 A1 * | 1/2003 | Linthicum | G06F 30/00 706/45 |
| 2004/0140901 A1 | 7/2004 | Marsh | |
| 2005/0222889 A1 * | 10/2005 | Lai | G06Q 10/06 705/7.41 |
| 2005/0265751 A1 | 12/2005 | Nakazato et al. | |
| 2005/0278049 A1 | 12/2005 | Van Den Nieuwelaar et al. | |
| 2006/0100852 A1 | 5/2006 | Gamon et al. | |
| 2006/0167738 A1 | 7/2006 | Spear et al. | |
| 2007/0060108 A1 | 3/2007 | East et al. | |
| 2008/0090645 A1 | 4/2008 | Walker et al. | |
| 2008/0119132 A1 * | 5/2008 | Rao | G06Q 30/02 455/3.04 |
| 2008/0122585 A1 | 5/2008 | Castaldo et al. | |
| 2009/0201122 A1 | 8/2009 | Stobbe | |
| 2010/0185475 A1 | 7/2010 | Holle | |
| 2011/0004590 A1 | 1/2011 | Lilley et al. | |
| 2011/0040660 A1 * | 2/2011 | Allison | G06Q 30/02 705/28 |
| 2011/0122995 A1 | 5/2011 | Ferro, Jr. | |
| 2012/0158452 A1 | 6/2012 | Shafiee et al. | |
| 2014/0099614 A1 | 4/2014 | Hu et al. | |
| 2014/0192790 A1 | 7/2014 | Samuel et al. | |
| 2014/0222493 A1 | 8/2014 | Mohan et al. | |
| 2014/0282003 A1 * | 9/2014 | Gruber | G06F 3/165 715/727 |
| 2014/0330659 A1 | 11/2014 | Yopp et al. | |
| 2015/0088779 A1 * | 3/2015 | Falcone | G06Q 10/083 705/330 |
| 2015/0290795 A1 * | 10/2015 | Oleynik | B25J 9/0081 700/257 |
| 2015/0302762 A1 * | 10/2015 | Sabourian-Tarwe | G06Q 50/12 434/127 |
| 2015/0334785 A1 * | 11/2015 | Visher | H05B 6/6438 219/626 |
| 2015/0365159 A1 * | 12/2015 | Bosworth | H04B 7/18502 455/11.1 |
| 2016/0244311 A1 | 8/2016 | Burks et al. | |
| 2016/0378853 A1 | 12/2016 | Mohammad | |
| 2017/0222868 A1 | 8/2017 | Tan | |
| 2017/0330571 A1 | 11/2017 | Komaki | |
| 2018/0121868 A1 * | 5/2018 | Hendrickson | G06Q 30/00 |
| 2018/0253068 A1 * | 9/2018 | Kim | G06F 21/34 |
| 2019/0045277 A1 | 2/2019 | Petrillo et al. | |
| 2019/0130786 A1 * | 5/2019 | Kumbakonam | G09B 5/02 |
| 2019/0291277 A1 | 9/2019 | Oleynik | |

* cited by examiner

COOKING MANAGEMENT SYSTEM WITH WIRELESS VOICE ENGINE SERVER

CROSS-REFERENCE TO RELATED APPLICATIONS

The present application is a continuation of and claims benefit of priority to U.S. Non-Provisional patent application Ser. No. 16/165,735 filed on Oct. 19, 2018 and entitled "Cooking Management System with Wireless Active Voice Engine Server" and to U.S. Provisional Patent Application No. 62/574,408, filed on Oct. 19, 2017, entitled "Cooking Management System," which are specifically incorporated by reference herein for all that they disclose or teach.

SUMMARY

The disclosed technology provides computer-to-wireless-voice integration methods and systems. In some implementations, the methods and systems deliver real-time voice instructions to users of time-sensitive actions and ensure that such directives are received and a recipient effectively acts on the directives.

Specifically, the disclosed technology relates to the provision of intelligent food cooking and food preparation instruction services that can be integrated into restaurant kitchen technology facilities. The methods and systems are designed to deliver real-time instructions and are optimized with respect to a number of different product factors, including current forecasted customer demand, presently available cooked product, cook times of different products, and product hold times. The system may include artificial intelligence methods, specifically, linear program models, that optimize the cooking amounts and methods when alternative ingredient batch sizes may be elected. The system may recognize time-sensitive actions that are required and interact with the recipient to ensure that such directives are received and effectively acted on.

The disclosed technology also includes wireless active voice methods and systems for the delivery of information to restaurant staff in a cooking management Wireless Active Voice Engine ("WAVE") system. The WAVE system includes a WAVE server, which delivers real-time verbal food preparation directions to restaurant staff via wireless headsets and ensures that such directives are received and a recipient effectively acts on the directives. The service is "active" rather than "passive" in that the system expects an acknowledgement from the user when each instruction is delivered. In some implementations, the system will not progress to delivering additional kitchen instructions until a former instruction is acknowledged. The system also delivers audio notifications (e.g., "beep signals") periodically (e.g., every 10 seconds) to remind the user that the system is awaiting an acknowledgement before it can progress to further instructions.

The disclosed systems and methods include receiving a notification of an event from a terminal in a WAVE system, determining an active voice directive corresponding to the event with a WAVE module, converting the active voice directive into a voice event via a directive converter, and notifying a targeted recipient of the active voice directive corresponding to the event with a communications module. In some implementations, the systems and methods include sending a confirmation event via the receiver to the communications module that the active voice directive was received by the targeted recipient and communicating the active voice directive has been completed via the receiver to the communications module.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following Detailed Description.

BRIEF DESCRIPTIONS OF THE DRAWINGS

DETAILED DESCRIPTION

Restaurants, and in particular the Quick Service Restaurant industry, are tasked with rapid cooking and delivery of quality products on demand. The efficiency of the restaurant kitchen depends on accurate and immediate determination as to which products are most urgently needed to fulfill current customer orders or in anticipation of future orders. Determination of which product is to be cooked and how many products to cook has historically been left to the experience of kitchen workers. There are several restaurant operation dynamics occurring at any given time, such as different product cooking times, different product hold times before the products must be discarded, customer arrival patterns, customers order content, and present staffing levels in the kitchen. Given the many product factors, use of experience alone does not render results that are optimal to the speed of delivery, quality of product and control of waste in the restaurant. The particular product(s) that a restaurant cook should begin preparing next is dependent on a number of factors at that specific instant in time; the cooking priorities constantly change in real time.

This disclosed technology includes systems and methods which monitor ordering activity in the restaurant and interact with kitchen staff directly. Through specific operations, the disclosed technology directs the kitchen staff with "just in time" task directives that optimize the restaurant kitchen cooking given the many product factors at any given moment (e.g., forecasts from historical transactions, present order velocity and order composition, time of day, kitchen staffing, etc.). The disclosed methods and systems perform continuous forecasting of needs given historical trends and prevailing current circumstances in the restaurant. The methods then determine the items/quantities most imminently needed and then determines the order in which such items should be cooked to avoid service delays.

Figure 1:
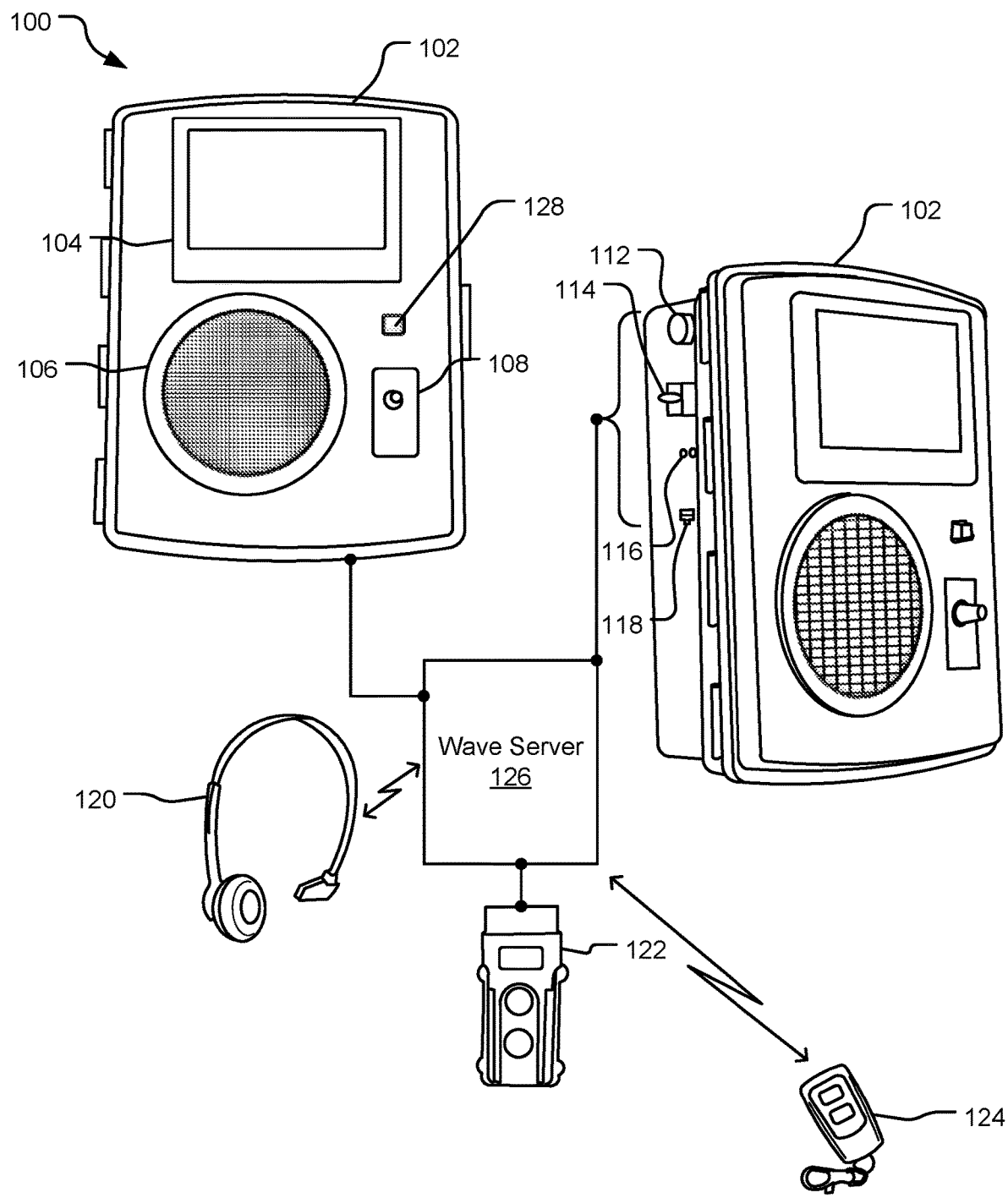
FIG. 1 is a schematic diagram of an example wireless active voice engine (WAVE) system.

Referring to FIG. 1, a schematic diagram of an example wireless active voice engine (WAVE) system 100 is shown. The WAVE system 100 includes the cooking management system processes described herein. The WAVE system 100 includes a WAVE server 126, which delivers real-time verbal food preparation directions to restaurant staff via wireless headsets and ensures that such directives are received and a recipient effectively acts on the directives.

The disclosed technology relates to the provision of intelligent food cooking and food preparation instruction services that can be integrated into restaurant kitchen technology facilities. The methods and systems are designed to deliver real-time instructions that are optimized with respect to a number of different product factors, including current forecasted customer demand, presently available cooked product, cook times of different products, and product hold times. The system may include artificial intelligence methods, specifically, linear program models, that optimize the cooking amounts and methods when alternative ingredient batch sizes may be elected. The system may recognize time-sensitive actions that are required and interact with the recipient to ensure that such directives are received and effectively acted on.

The service is "active" rather than "passive" in that the system expects an acknowledgement from the user when each instruction is delivered. In some implementations, the system will not progress to delivering additional kitchen instructions until a former instruction is acknowledged. The system also delivers audio notifications (e.g., "beep signals") periodically (e.g., every 10 seconds) to remind the user that the system is awaiting an acknowledgement before it can progress to further instructions.

Figure 2:
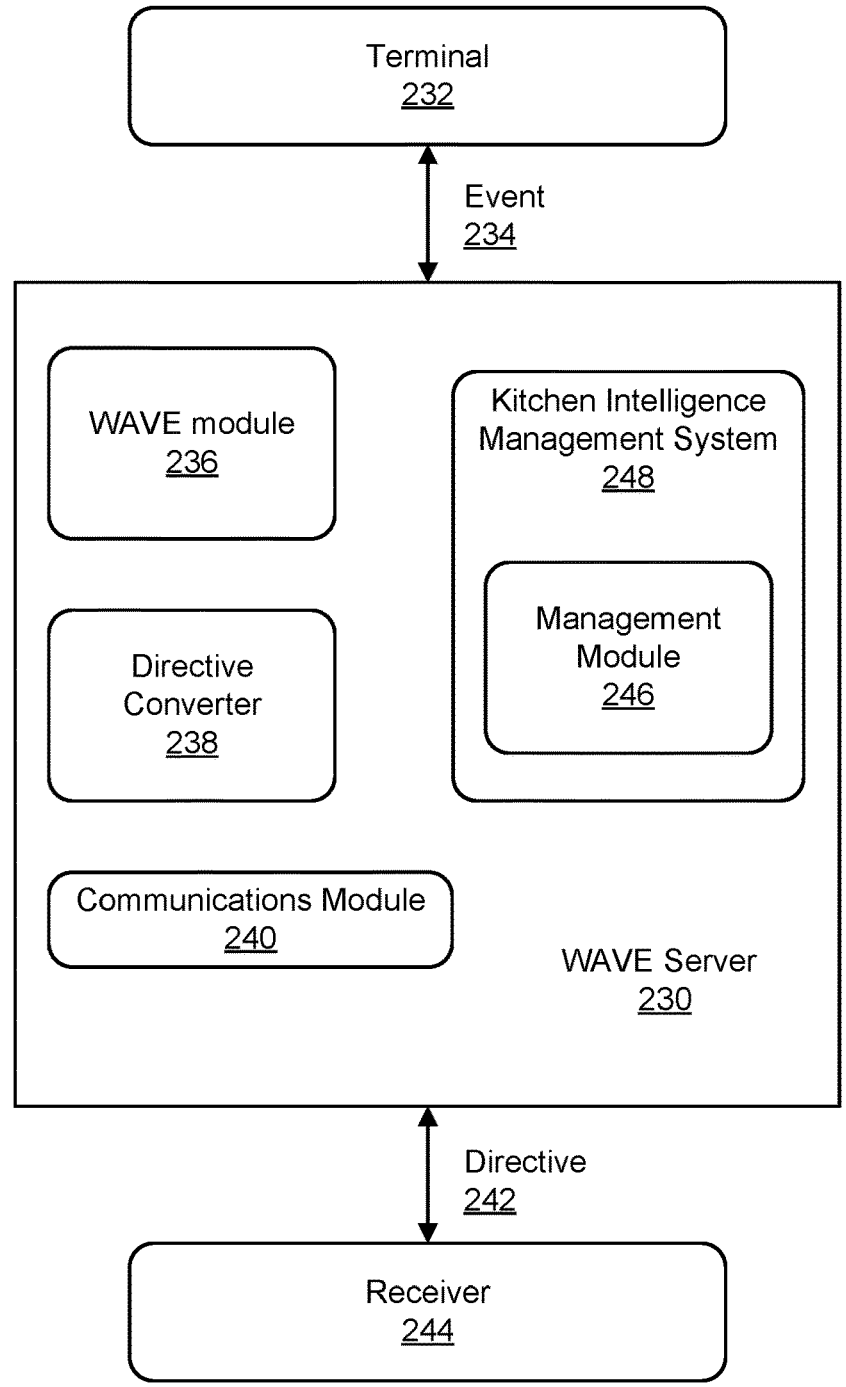
FIG. 2 is a block diagram of an example WAVE system.

In one implementation, the WAVE system 100 uses a wireless headset system that is integrated with a Kitchen Intelligence Management System (KIMS) (described in FIG. 2). In some implementations, the KIMS may be incorporated in the WAVE system 100. In other implementations, the KIMS may be incorporated in separate application or system.

In the implementation shown in FIG. 1, the WAVE system 100 is completely turnkey (requires no additional hardware/software such as PC, monitor, communication software, etc.). A WAVE unit 102 in the WAVE system 100 may contain a main interface 104 on the exterior of the WAVE unit 102. The WAVE unit 102 may also include an onboard PC, and host a Kitchen Intelligence Management System, a WAVE server, and communication software (not shown). The WAVE unit 102 may be configured to communicated with a wireless headset base unit 120, a wired button control 122, and a wireless button control 124.

In some implementations, the WAVE system 100 may be wired and/or may utilize wireless button controls. The WAVE system 100 in FIG. 1 is configured so that all connections including, ethernet connection to the restaurant network, connection to a user interface (e.g., a button), and connection to the user wireless headsets are all available as wireless options. In other words, no in-restaurant cabling is required to integrate the system; only a power cable must be plugged into a wall outlet.

The WAVE system 100 provides a number of interfaces that may optionally be additional to or may replace the wireless options. The interfaces as shown in FIG. 1 permit the addition of an external display monitor 112, a hard-wired connection of up to two user button interfaces 116, and a CATS ethernet cable connection 118 into the restaurant network. There may also be a USB connection 114, which can be used to extend the WAVE system 100 abilities, to provide onsite updates to the embedded PC, or for use by a service-person.

The WAVE unit 102 also houses a speaker 106 with a speaker volume control 108.

Such can be used exclusively to deliver instructions to kitchen personnel or in addition to the wireless headsets. The volume can be adjusted to 0 to turn the internal speaker off.

In another second implementation, a WAVE system 100 operates similarly to the implementation in FIG. 1, however, a restaurant wireless headset system previously installed in a restaurant for their drive-through operation may be used (e.g., HME Drive-through wireless headset system). This second implementation permits a two-channel communication (multi-user) WAVE system 100. One channel can be used to send verbal instructions to a kitchen cook while the other channel can be used to send verbal advice to a restaurant manager or anyone else. This HME-interfaced hardware configuration is more complex than the WAVE system 100 in FIG. 1. In this second implementation, the restaurant uses a communication "base" station to service other in-store needs. This hardware configuration can interface with the existing in-restaurant base unit via an HME transceiver integration. This provides a communication channel from the WAVE system 100 into the HME base unit for ultimate delivery to designated users.

The other aspect of the HME system that renders this second implementation more complex than the WAVE system 100 in FIG. 1 is that the HME transceivers are "push to talk" rather than "always on." As such, this implementation requires a hardware interface that permits WAVE to simulate the pressing of interface input buttons on the transceiver (e.g., press the "Talk on Channel A" button, "turn the transceiver on", etc.).

In a third implementation, there may be interconnectivity with the HME drive-through wireless headset system to deliver verbal commands and feedback to users. While the hardware external interfaces may be the same as in the first example (i.e., USB port, two ⅛" audio plugs and one AC power cord), the internal hardware components are significantly different. The hardware configuration in this third implementation uses hardware "switches" that are controlled by the WAVE software to turn on/off the transceiver, to activate the push-to-talk button in order to deliver speech to the user and to change which channel is to be used in delivering the speech.

Many transceivers use battery power, which may reduce distortion that is common in AC power (essentially wall plugs). As such, the configuration in the third implementation incorporates sophisticated hardware components that deliver absolute linear (void of distortions) power by alternating two batteries in use. One battery powers the transceiver while the second battery is being recharged. After a specified period of time, the roles of the two batteries are reversed and the transceiver is recycled. All of this power management functionality is provided through the WAVE software which interacts with the power supply switches via the USB interface.

In some implementations, a possible power supply and management hardware unit can be configured with a power charger and circuit switching hardware. In some implementations, as in the example in FIG. 1, the audio output from the PC may require conversion from "audio headset" level to "Line level."

Referring to FIG. 2, a block diagram of an example WAVE system 200 is shown. Specifically, the WAVE system 200 may be incorporated into the hardware shown in FIG. 1. By way of background, a restaurant quick service order may be entered by an order taker at a front counter point-of-sale (POS) terminal. Order items may be cooked and assembled in the kitchen for delivery to the customer. POS systems may be robust in the logging of order data in a master database and in their ability to interface with "kitchen management systems."

Products such as hamburger patties, chicken filets, French fries, etc. may be made available to fulfill each customer food order. In restaurant kitchens, such cooking needs may be determined by a kitchen cook by visually reviewing pending orders on display monitors or on printed receipts. Such method requires that the kitchen cook vigilantly monitor the kitchen display screens or printers to ensure that the he or she immediately acts on any new food order needs.

The disclosed WAVE system 200 may not include legacy display monitors and printers to fulfill a food order. Regardless of where a cook is located, with the WAVE system 200, the cook is immediately made aware via a headset of a new event or food order 234 so that the cook may immediately react and fulfill the food order 234. Specifically, a new food order 234 may be entered into a terminal 232 which is received by the WAVE server 230. For example, a new food order 234 may be manually entered into a monitor or audibly entered into a microphone, which constitutes the terminal 232.

A KIMS 248 determines tasks, commands, or instructions corresponding to the specific food order 234. The commands or instructions for the new food order 234 are constructed in Management Module 246 and are sent to WAVE module 236 where they are converted into a directive (e.g., an active voice directive 242) with a directive converter 238.

The directive 242 may be communicated via a communications module 240 to a receiver 244 outside the WAVE server 230. For example, the active voice directive 242, including task directions, may be delivered to a receiver 244, which is a cook's headset. In some implementations, the active voice directive 242 may be in the cook's preferred language which increases the level of accuracy of the food order completed by the cook. In response to receiving the active voice directive 242, the cook is required to acknowledge that he or she has received and then acted on the active voice directive. An input(s) into the receiver 244 (or another device) confirming receipt of the food order may be communicated to the communications module 240 in the WAVE server 230 and communicated to the terminal 232. As a result, the cook can work hands-free with real-time delivery of required tasks via natural voice.

In some implementations, the WAVE module 236 (or another module in the WAVE system 200, such as the management module 246 or a clock or processor) can measure a time period following the transfer of the active voice directive 242 to a cook, or other targeted recipient, via the communications module 240 to the receiver 244. The WAVE module 236 can determine whether the time period is greater than a predetermined threshold. For example, a predetermined threshold may be a specified reasonable amount of time to respond to confirm a directive has been received (e.g., 15 seconds). If an active voice directive 242 is transferred to a receiver 244 and no confirmation that an active voice directive 242 has been received after 15 seconds, the WAVE module 236 may communicate that there was no confirmation that the voice event was transferred to a targeted recipient. Or, in another example, if an active voice directive 242 is transferred to a receiver 244 and no confirmation is made that an active voice directive 242 has been received after 15 seconds, the WAVE module 236 may resend the active voice directive 242. In some implementations, the WAVE module 236 may keep resending the active voice directive 242 until confirmation is received. In another example, if an active voice directive 242 is transferred to a receiver 244 and confirmation is made that an active voice directive 242 has been received in less than 15 seconds, the WAVE module 236 may send a coaching event that communicates coaching feedback, as described above. The KIMS 248 can include the Management Module 246 that can iteratively determine product factors, which may include at least one of current forecasted customer demand, presently available cooked product, cook times of different products, and product hold times. The WAVE module 236 can determine a first active voice directive corresponding to a first event based on the plurality of product factors.

In some implementations, the KIMS 248 can monitor and manage "back-office" data associated with employee timekeeping, restaurant orders, drive-through timings, etc. Management of a quick service restaurant requires many reactions by the store manager on a daily basis. The timely response or reaction of a store manager directly affects the efficiency and profitability of the restaurant.

Back-office data may be accessed by an application that may passively (or actively) deliver advisory information to a store general manager throughout the day. In some implementations, the management module 246 collects, stores, and transfers the back-office data via the communications module 240 to a manager via the receiver 244.

Such advisory information may include, by way of example:

Advance notification when an employee is about to enter overtime status.

Advance notification when an employee requires a work break.

Notification when a drive-through car timing has exceeded a particular threshold.

Notification when sales are lower than originally forecasted and that labor is presently running high as a result.

Notification when there is a lull in sales activity rendering an opportune time for restaurant clean-up tasks to be initiated.

In one example of the WAVE system 200, an impending 15-minute time segment may anticipate the need for 20⅓ lb hamburger patties, 15¼ lb patties and 5 chicken patties. To prevent product shortage and delays, the system may direct the kitchen staff to cook 5⅓ lb patties, 5¼ lb patties and 2 chicken patties. Once those have been cooked, the system may then direct the kitchen to cook 7⅓ lb patties, 3¼ lb patties and 2 Chicken patties. In other words, the system will fully optimize what items are cooked and the sequence in which they are cooked as determined by cook time, expected needs, etc. so as to minimize production delays.

In some implementations, the disclosed technology can direct the cooking of ingredients (e.g., hamburger patties), the preparation of assembled items (e.g., cheeseburgers), and the cooking of batches of either ingredients or saleable items. This can be exceedingly valuable in restaurants that have high sales of particular items (e.g., cheeseburgers, fries) at particular times of the day.

| ID | Type | Name | Quantity | Batch Association |
|---|---|---|---|---|
| 0006 | Batch | Half Basket Fries | 16 ounces | 0007 |
| 0007 | Batch | Basket of Fries | 33 ounces | |

The disclosed technology also provides for automated determination of optimal item/ingredient/batch cooking and permits manual definition of item/ingredient/batch cooking preference based on "start time" and "end time" definitions for each. In an implementation with manual determination, the user may define each entry (ingredients, items, batches) with a designation as to when the item is to be "actively" managed by the system. For example, as shown in the table below, a manual definition for biscuits may be that the system manages the tracking and cooking of the item during the hours of 5:00 a.m. to 7:00 a.m. and the hours of 10:00 a.m. to noon. During the hours of 7:00 a.m. to 10:00 a.m., the system can be defined to direct cooking biscuits in batches (e.g., a pan of 12 biscuits) while the 2nd definition may direct the kitchen to cook in "half-pan" batches.

| ID | Type | Name | Quantity | Batch Association | Start Time Active | End Time Active |
|---|---|---|---|---|---|---|
| 0001 | Ingredient | Biscuit | 1 each | 0003 | 05:00 | 07:00 |
| 0002 | Batch | Pan of Biscuits | 12 each | 0003 | 07:00 | 10:00 |
| 0003 | Batch | Half Pan Biscuits | 6 each | | 07:00 | 10:00 |
| 0001 | Ingredient | Biscuit | 1 each | 0003 | 10:00 | 12:00 |

The disclosed technology also supports batch preparation of ingredients and/or batches of items. It can be more efficient to cook a large batch of ingredients to satisfy a number of upcoming needs. There are also times when use of batches should be avoided as such may result in unused product that becomes waste because its hold time is exceeded or the quality of the product suffers. The disclosed technology supports definition of different batch sizes (e.g. basket of fries, half-basket of fries, small fry order, etc.) for any given product. With such alternative batch sizes, the KIMS 248 may then employ artificial intelligence methods to choose and direct the staff to cook a particular batch size that optimizes overall cost given multiple factors including product cost, labor cost and expected waste given product hold time.

The following table demonstrates the definition of multiple batch size alternatives for a single item. For French fries, the following table provides 5 different definitions for French fries, each one defining a different alternative quantity of the ingredient. They are formally associated with one another as "alternative" cooking elections through the last column "Batch Association" which indicates that item IDs 0003 through 0007 are all alternative elections to meet current cooking needs of "French Fries".

| ID | Type | Name | Quantity | Batch Association |
|---|---|---|---|---|
| 0001 | Ingredient | Biscuit | 1 each | 0002 |
| 0002 | Batch | Pan of Biscuits | 12 each | |
| 0003 | Item | Small French Fry | 7 ounces | 0007 |
| 0004 | Item | Medium French Fry | 9 ounces | 0007 |
| 0005 | Item | Large French Fry | 11 ounces | 0007 |

In one implementation, with automated determination of item/batch (or product/batch) cooking, a KIMS may facilitate an operation that uses the following list of product factors, by way of example, to determine whether the kitchen should be instructed to cook an individual item or a batch of the item (or an ingredient or batch of ingredients):

1. present on-hand quantities of the product;
2. forecasted needs for the current segment and the next two-time segments with weighting applied to each segment;
3. defined build-to and build-threshold levels; and
4. performance target (conservative, average or aggressive).

In the event that product and labor costs are incorporated into the KIMS, the disclosed invention may additionally implement an operation (e.g., a Linear Program (LP)) model to determine the optimal ingredient/item selections for cooking in order to optimize the operation. For any particular product that has multiple linked batch options, the product may be cooked using any of the several alternative batch amounts. For example, French fries can be cooked by the basket, half-basket, or by the specific quantity ordered (e.g., small, medium or large fry). An LP model may determine the optimal cooking amount/method with a "goal" of minimizing the cost given present needs/forecast. The choice of best cooking method can use such an LP model that considers not only forecasted and current product demand but it can additionally consider the labor cost of cooking different batch amounts and the product cost of waste (excess product that may expire in advance of need).

In one implementation, the following model may be configured using "French Fries," as an example:

```
Given:
    Qty Required = total ounces of fries that are needed to fulfill present needs
    Item1 = "Small French Fry" uses 8 ounces of Fries (Units1),
    Item2 = "Medium French Fry" uses 9 ounces of Fries (Units2),
    Item3 = "Large French Fry" uses 10 ounces of Fries (Units3),
    Batch = "Batch of Fries" cooks 30 ounces of Fries (Units4)
    LaborPerTask = $0.11
    Waste = QtytoCook − Qty Required
    CostperUOM = Cost per ounce of fries
Then the Goal may be
Minimize cost of
QtyItem1 * Units1 * CostperUOM +
QtyItem2 * Units2 * CostperUOM +
QtyItem3 * Units3 * CostperUOM +
QtyBatch * Units4 * CostperUOM +
Waste * CostperUOM +
(QtyItem1 + QtyItem2 + QtyItem3 + QtyBatch) * LaborPerTask
With Constraints:
QtyItem1 >= 0, QtyItem2 >= 0, QtyItem3 >= 0, QtyBatch >= 0
QtyCooked >= QtyRequired
QtyItem1+QtyItem2+QtyItem3 <= 2
```

In the restaurant kitchen, the priorities of cooking are determined by not only product forecast needs, but also by the content of actual customer orders entering the system. What product a cook should begin preparing next is dependent on the instant in time the question is asked because the cooking priorities constantly change in real time. The disclosed technology repeatedly recalculates needs of ingredients/items/batches in view of each new piece of information it receives (newly ordered items or time progression through forecasted needs).

Determining what should be cooked and when it should be cooked can be a complex task. Product factors that must be considered are the present demand for the product, the time it takes to cook the product, how much of the product is presently available (is cooked and on hand), the "hold time" that a product can wait for use before it must be discarded and the forecast of upcoming customer demand that has yet to materialize via actual orders.

Additionally, the optimal cooking of any particular product may invoke instructions to cook a specific ingredient (e.g., beef patty), or to cook/prepare a specific item that has high sales incidence (e.g., egg sandwich) or even possibly to cook a "batch" of a particular ingredient/item when higher volume dictates such to be appropriate (e.g., tray of biscuits, basket of fries). The permutations of possibilities to consider in optimizing the kitchen operation are enormous and beyond human spontaneous capability.

The disclosed technology interacts with the kitchen staff through verbal instructions delivered through the WAVE Server. The disclosed technology also displays instructions on a display monitor. The disclosed technology implements feedback mechanisms with which the kitchen staff signal the system when they have completed the previous cooking instruction. This means that the system is "actively" engaged with the user in a feedback loop rather than passively delivering instructions, assuming they are received and assuming they are immediately acted upon. The feedback mechanism can be user "button controls" as in the WAVE server or a particular implementation may use voice feedback from the kitchen staff via voice recognition. A feedback mechanism may be incorporated within the implementation and a particular solution should implement some form of an alert facility (audible beeps or flashing light) that alerts kitchen staff that a cooking instruction remains outstanding and awaiting acknowledgement.

The disclosed technology intends the use of "configuration" parameters that define overarching performance goals and system specifics. It also expects definition of the ingredients, items and batches that are to be monitored and managed by the system. As part of the general definitions (not item specific) an implementation might also permit the definition of default configuration values. If any parameter field is missing in any particular item/ingredient definitions, then the default settings may apply to that ingredients/items. These configuration definitions may be stored in database tables, XML, files, JSON files or simple text files.

The following list of parameters are an example of one particular implementation that provides user definition of system expectations.

| Parameter | Example Setting | Parameter Description |
|---|---|---|
| ForecastMethod | Conservative | The statistical method to be applied to historical product sales in determining expected product needs.<br>Valid settings may be "Conservative," "Average" and "Aggressive." One method of forecasting expected needs based on values may be:<br>1. Retrieve quarter-hour sales for this same particular day from the previous six historical weeks of sales.<br>2. Discard the highest and lowest values.<br>3. If "Conservative" has been specified, then forecast = minimum of the remaining four-week occurrences in each quarter hour |

| Parameter | Example Setting | Parameter Description |
|---|---|---|
| | | 4. If "Average" has been specified, then forecast = average of the remaining four-week occurrences in each quarter hour. |
| | | 5. If "Aggressive" has been specified, then forecast = maximum of the remaining four-week occurrences in each quarter hour. |
| MaxVoiceProducts | 3 | The maximum number of different ingredients/items that will be included in a single cooking directive |
| MaxVoiceQuantity | 12 | The maximum quantity of each product that a cooking directive will request cooking of |
| StoreType | Sams_BBQ | The name of the brand (and associated brand logo JPG file name) |
| BatchDetermination | Manual | Whether "Automated" or "Manual" determination is to be used in directing cooking of a particular ingredient (or item) or it's associated "batch" |
| BinPctThreshold | 0.4 | Default percent of forecasted quantity that on-hand quantity must fall below before cooking directive is issued |
| BuildTo | 0.7 | Default percent of forecasted amount that KAI system will direct to be cooked |
| CookTime | 2:30 | Default cook time for products that do not contain an associated definition (mins:secs) |
| HoldTime | 15:00 | Default "hold time" for items/products that do not contain a HoldTime definition (mins:secs) |

In a restaurant, not all items are prepared in the kitchen. For example, salads are often handled by servers, drinks are handled by cashiers or they may be self-serve. The WAVE system must be informed as to what items it must monitor and how/when it should react to needs. To perform these functions, the disclosed technology constructs a database that contains historical and current information regarding each item and product.

In one implementation, the following table provides item definition parameters. Other implementation may be appropriate in restaurants that require more or less information or more/less control.

| Field | Example | Description |
|---|---|---|
| Item or Ingredient | Item | Designates whether this definition is for a saleable "Item" or an "Ingredient" |
| ItemNbr | 94765 | The item/ingredient number that identifies this particular definition |
| ItemName | Cheeseburger | Name of the item/ingredient |
| BatchSize | 33.5 | The quantity of a particular item/ingredient that comprises a "batch" (if this is defined, then this definition is assumed to be a batch definition) |
| BatchName | Basket of Fries | Name of the batch |
| Associated Item | 6785 | An item or ingredient batch that an item/ingredient is associated with |
| StartTime | 7:00 | Time of day when KAI should begin managing this item/ingredient |
| StopTime | 14:30 | Time of day when KAI should discontinue managing this item/ingredient |
| HoldTime | 17:00 | Number of minutes:seconds that this item/ingredients can be held before it should be discarded |
| BuildTo | 0.85 | The percent of forecasted needs KAI should instruct cooking (the lower the percent, the less risk of waste but the higher risk of cooking more frequently) |
| BinPctThreshold | 0.35 | The percent of forecasted needs that are satisfied by on-hand cooked product before more cooking will be requested (the lower the percent, the less frequently cooking is requested but a higher risk of running out of product) |
| CookTime | 2:30 | Number of minutes:seconds required to cook this item/ingredient |

Given this particular list of item definition fields, the following table presents an example of sample item definitions for a restaurant concept.

| Item or Product | Item ItemNbr | Item Name | Batch Size | Batch Name | Associated Item | Start Time | Stop Time | Hold Time | Build to | Threshold | Cook Time |
|---|---|---|---|---|---|---|---|---|---|---|---|
| Ingredient | 71465 | French Fries | 32.72 | Basket of French Fries | | 11:00 | 14:00 | 07:00 | | | 02:30 |
| Ingredient | 71465 | French Fries | 32.72 | Basket of French Fries | | 17:00 | 20:00 | 07:00 | | | 02:30 |
| Item | 4623 | Large Fries | | | 71465 | 04:00 | 11:00 | 07:00 | 0.00 | 0.00 | 02:30 |
| Item | 4684 | Medium Fries | | | 71465 | 04:00 | 11:00 | 07:00 | 0.00 | 0.00 | 02:30 |
| Item | 4685 | Small Fries | | | 71465 | 04:00 | 11:00 | 07:00 | 0.00 | 0.00 | 2:30 |
| Item | 345 | Cheeseburger | | | 998 | | | | | | 01:45 |
| Item | 998 | Cheeseburger | 4 | Batch of 4 cheeseburgers | | 11:00 | 14:00 | 07:00 | | | 01:45 |
| Ingredient | 71324 | Beef patty | | | | | | | | | 01:45 |

In order to perform the aforementioned functions, the disclosed technology can construct a database that contains historical and current information regarding each item and product. In some implementations, database tables are as follows:

Product Availability Table

This table records the amount of cooked product (items and/or ingredients) that is presently available to fulfill order needs.

| Ingredient/Item ID | Avail Qty |
|---|---|
| 0001 | 5 |
| 0002 | 2 |
| 0003 | 1 |

Item Forecast Table

This table records the quantity of each item that is expected to occur in each quarter hour of a given business day.

| | Quarter Hour Start Times | | | | | | | |
|---|---|---|---|---|---|---|---|---|
| Item ID | 12:00 | 12:15 | 12:30 | 12:45 | 13:00 | 13:15 | 13:30 | 13:45 ... |
| 0001 | 5 | 4 | 4 | 5 | 6 | 6 | 2 | 1 |
| 0002 | 2 | 2 | 1 | 2 | 1 | 1 | 1 | 0 |

Product Forecast Table

This table records the quantity of each ingredient (as exploded from the item recipe files) that is expected to occur in each quarter hour of a given business day.

| Ingredient ID | Unit of Measure | Quarter Hour Start Times | | | | | | | |
|---|---|---|---|---|---|---|---|---|---|
| | | 12:00 | 12:15 | 12:30 | 12:45 | 13:00 | 13:15 | 13:30 | 13:45 ... |
| 15345 | oz | 26 | 25 | 28 | 34 | 35 | 33 | 24 | 16 |
| 32589 | lbs | 6 | 4 | 5 | 8 | 8 | 9 | 6 | 2 |
| 245698 | each | 32 | 38 | 56 | 58 | 58 | 60 | 45 | 32 |

Item Usage Table

The following table records the actual item quantity sales that have occurred within each quarter hour of orders within the current business day. Quarterly-hour buckets are filled in as they are completed during the current business day.

| | Quarter Hour Start Times | | | | | | | |
|---|---|---|---|---|---|---|---|---|
| Item ID | 12:00 | 12:15 | 12:30 | 12:45 | 13:00 | 13:15 | 13:30 | 13:45 ... |
| 0001 | 3 | 6 | 7 | 6 | 7 | 4 | 3 | 2 |
| 0002 | 3 | 2 | 2 | 1 | 3 | 2 | 1 | 0 |

The item/ingredient needs for the current forecast time horizon may also be computed periodically (e.g., every 15 seconds) so that cooked product quantities are optimal even when no customer orders are presently occurring in the restaurant.

In a restaurant, a cook may be constrained by time. The cook may only remember a limited number of instructions at one time and can only cook "x" number of items in "y" amount of time. The disclosed technology optimizes the number of items the user is directed to cook, and the associated quantity to cook in view of the constraints. The number of items that can be cooked in an amount of time varies from restaurant to restaurant based on the items that are cooked, the type of cooking equipment, the amount of equipment (e.g., number of fryers) and the number of cooks. As such, these are parameters that are supplied to the system via the configuration parameters that were formerly described.

Given a defined set of configuration parameters, optimal cooking instructions are calculated given current needs. Current needs from each order are transmitted to the system via an interface with the restaurant point-of-sale system. With the arrival of each new order information packet (item needed, item cancelled), an operation may determine the resulting needs for additional cooked items as a result. For example, the following operation may determine the resulting needs:

```
For each item ordered within the new order
    Using the recipe file, explode the item into its constituent ingredient requirements
Next
For each product (item or ingredient) in the new order
    If this is a forecasted item or ingredient then
        Decrement quantity of "On-hand Qty" for the product
    Else
        Add product to an "Immediate Cooking" list with time_needed = now
    End if
Next
```

The next task is to determine what additional product cooking is required to satisfy forecasted needs versus current product "On Hand" quantities. The following operation provides an additional list of requirements:

```
Current_Requirements_Process( )
{
    DateTime Curr_segment, Next_segment, Next_next_segment;
    Float current_pct, next_pct, next_next_pct;
    Bool product need_products_cooked = false;
    //Determine needs versus availability for all forecasted products
    For each product in the "Product Forecast Table"
        Get_Segments(product.Product_ID, Curr_segment, Next_segment,
        Next_next_segment,
            current_pct, next_pct, next_next_pct);
        Product_requirement =
            Curr_segement.forecast * current_pct + Next_segment.forecast * next_pct +
            Next_next_segment.forecast * next_next_pct;
        Product_requirement = Product_requirement * Build_percent
        If Product_avail for this Product < Product_requirement then
        Need_products_cooked = true;
            Cook_need = (Product_requirement − Product_avail)
            Updated Window Grid cell for this product setting cooking needs = Cook_need
        End if
    Next
}
```

The "Get Segments" routine that is referenced in the former operation may be a mathematical extrapolation of "known" quarter-hour historical requirements into the current forecast timeframe. In one implementation, if the time is 7:07 a.m. and the system is configured to forecast for the ensuing quarter hour, then the forecast horizon is 7:07 to 7:22. But the historical data may be stored in quarter hour fields that don't align with the current forecast timeline. The historical segments of 7:00-7:15, 7:15-7:30, may then be translated into requirements for 7:07-7:22. This is accomplished by computing the percent of each historical segment that contributes to the forecast horizon and then multiplying each contributed segment quantity by its percent contribution. A programming algorithm identifies which historical segments are contributors and their percent of contribution.

```
Get_Segments(int Product_ID, ref int Curr_seg_hour, ref int Curr_seg_min, ref int Next_seg_hour,
            ref int Next_seg_min, ref int Next_Next_seg_hour, ref int Next_Next_seg_min,
            ref Double Pct_curr_seg, ref Double Pct_next_seg, ref Double Pct_next_next_seg)
{
    //Determine the current 15-minute segment containing the present time-of-day
    int Current_hour = DateTime.Now.Hour;
    int Current_minutes = DateTime.Now.Minute;
    Curr_seg_hour = Current_hour;
    Curr_seg_min = 15 * System.Convert.ToInt32(Current_minutes/15);
    Next_seg_hour = Curr_seg_hour;
    Next_seg_min = 0;
    Next_Next_seg_hour = Curr_seg_hour;
    Next_Next_seg_min = 0;
```

```
int Remaining_time_in_Current_segment;
double Time_in_next_segment;
if (Curr_seg_min == 45)
    Next_seg_hour = Curr_seg_hour + 1;
else
    Next_seg_min = Curr_seg_min + 15
    Next_Next_seg_hour = Next_seg_hour;
if (Next_seg_min == 45)
    Next_Next_seg_hour = Next_seg_hour + 1;
else
    Next_Next_seg_min = Next_seg_min + 15;
if (Next_seg_hour > 23) Next_seg_hour = 0
if (Next_Next_seg_hour > 23) Next_Next_seg_hour = 0;
//Determine the forecasting horizon that should be used for this product
if ((Product_hold_time + cook_time) < Prod_Forecast_Horizon)
    Prod_Forecast_Horizon = Product_hold_time + System.Convert.ToInt32(cook_time);
//Determine percent of each segment forecast that should be used.
Remaining_time_in_Current_segment = 15 – Current_minutes % 15;
if (Remaining_time_in_Current_segment >= Prod_Forecast_Horizon)
{
        Remaining_time_in_Current_segment = Prod_Forecast_Horizon;
        Pct_curr_seg = Remaining_time_in_Current_segment / 15.0;
        Pct_next_seg = 0;
        Pct_next_next_seg = 0;
}
else
{
        Pct_curr_seg = Remaining_time_in_Current_segment / 15.0;
        Time_in_next_segment = Prod_Forecast_Horizon – Remaining_time_in_Current_segment;
        if (Time_in_next_segment > 15)
        {
            Pct_next_seg = 1;
            Pct_next_next_seg = (Time_in_next_segment – 15) / 15.0;
        }
        else
        {
            Pct_next_seg = Time_in_next_segment / 15.0;
            Pct_next_next_seg = 0;
        }
    }
  }
}
```

As a last step in this formula, the results of both the new order "immediate needs" and the forecasted needs may be:
Combine all current needs a single queue,
Explode into a queue of products with an expected time of need for each individual item (i.e., a need of 3 burger patties may explode into 3 entries of 1-burger patty).

| Original Product Need | Exploded Item List | Time Needed |
|---|---|---|
| 3 Chicken → Filets | 1 Chicken Filet | 7:12 |
| | 1 Chicken Filet | 7:14 |
| | 1 Chicken Filet | 7:16 |
| 2 Hamburger → Patties | 1 Hamburger Patty | 7:13 |
| | 1 Hamburger Patty | 7:14 |

Sort the exploded queue of all products ordering it by the "expected time" it will be needed Sequentially traverse the sorted queue, adding items/quantities into a set of most important cooking instructions while respecting the constraints on max number of items and item quantities as defined in the configuration parameters.

Deliver the aggregated needs to the kitchen via a verbal instruction

Update the system product/item on-hand quantities once the user acknowledges completion of the cooking instruction.

The following operation performs a final transformation:

```
//We must combine predicted and ordered products that are needed and sort them
        Combine ordered item/ingredient products/quantities that have been ordered with those
        forecasted
For each item in the combined list
{
    for (int i = 1; i <= prediction.Needed; i++)
    {
        secondsToCook = ((prediction.BinCount + i) / prediction.Prediction) *
        prediction.PredictionTime – prediction.ChainSpeed;
        for (j = 0; j < voicePredictions.Count; j++)
```

```
            {
                        if (secondsToCook , voicePredictions[j].secondsToCook)
                                break;
            }
                        Insert to list ProductId, quantity=1, and secondsToCook;
    }
                total Quantity = 0
                foreach (item_requirement in the combined list of items)
                {
                        If (totalQuantity + item_requirement.orders <= _maxVoiceQuantity ||
                        item_requirement.BatchSize > 0)
                        {
                                // check for existing VoiceProduct
                                int voiceIndex = FindVoiceProduct(voiceQueue, voicePrediction.productId);
                                if (voiceIndex >= 0)
                                {
                                        voiceQueue [voiceIndex].orders += voice Prediction.orders;
                                        if (voicePrediction.BatchSize = = 0)
                                                totalQuantity += voicePrediction.orders;
                                }
                                else if (voiceQueue.Count < _maxVoiceProducts && voicePrediction.orders > 0)
                                {
                                        voiceQueue.Add(new VoiceProduct(
                                                voicePrediction.productId,
                                                voicePrediction.name,
                                                voicePrediction.orders,
                                                voicePrediction.secondsToCook,
                                                voicePrediction.BatchName,
                                                voicePrediction.BatchSize,
                                        ));
                                        if (VoicePrediction.BatchSize = = 0)
                                        totalQuantity += voicePrediction.orders;
                                }
                        }
                }
```

In some cases, Restaurant Quick Service orders may be entered by order takers at a front counter Point of Sale terminal. The items may then be cooked and assembled in the kitchen for delivery to the customer. All current point-of-sale systems are quite robust in their logging of order data in a master database and in their ability to interface with "kitchen management systems."

Products such as hamburger patties, chicken filets, French fries, etc. must be made available to fulfill each customer order. In restaurant kitchens, such cooking needs are normally determined by the cooks by looking at pending orders on display monitors or on printed receipts. This requires that the kitchen cooks be constantly watching the monitors or printers to ensure that they immediately act on any new product needs. The cooks must use their experience to determine what ingredients (e.g., hamburger patties), the quantity of each and the order of cooking the items. The cooks may make these determinations only for orders that have already been placed by customers; forecasting is not included.

The KIMS may be configured to determine the most important kitchen actions required at any given point in time. These determinations may be continuously calculated in real-time as orders are entered into the restaurant POS system. Absent orders at any particular time segment, the system can periodically recast item and ingredient forecasted needs to prepare for expected future orders.

The KIMS can be configured to deliver the cooking instructions to the kitchen staff via voice commands through WAVE technology. Once a cooking instruction is delivered to the kitchen, the system may wait for feedback (acknowledgement) that the directive had been completed by the cooks. With receipt of acknowledgement, the KIMS may then determine what if any additional cooking needs exist. If such needs do exist, the KIMS may immediately deliver additional cooking instructions to kitchen staff via the WAVE system. The KIMS can ensure that the kitchen is cooking product and preparing items in an optimal manner to ensure:

1. Products are available for order fulfillment at the earliest possible time;
2. Products quality is high by cooking only the amount of product that is forecast for need within the defined product "hold time;" and
3. Product waste is minimized by ensuring only enough product is cooked and prepared to meet the expected demand.

The WAVE system may provide a status screen that can present key information to kitchen staff and restaurant management. The following example presents one possible system information "dashboard" screen. Additionally, the KIMS may produce a log that can record every item cooking request from the POS system, each cooking directive that was sent to the kitchen (via the WAVE technology) and when each cooking directive is responded to by kitchen staff.

Figure 3:
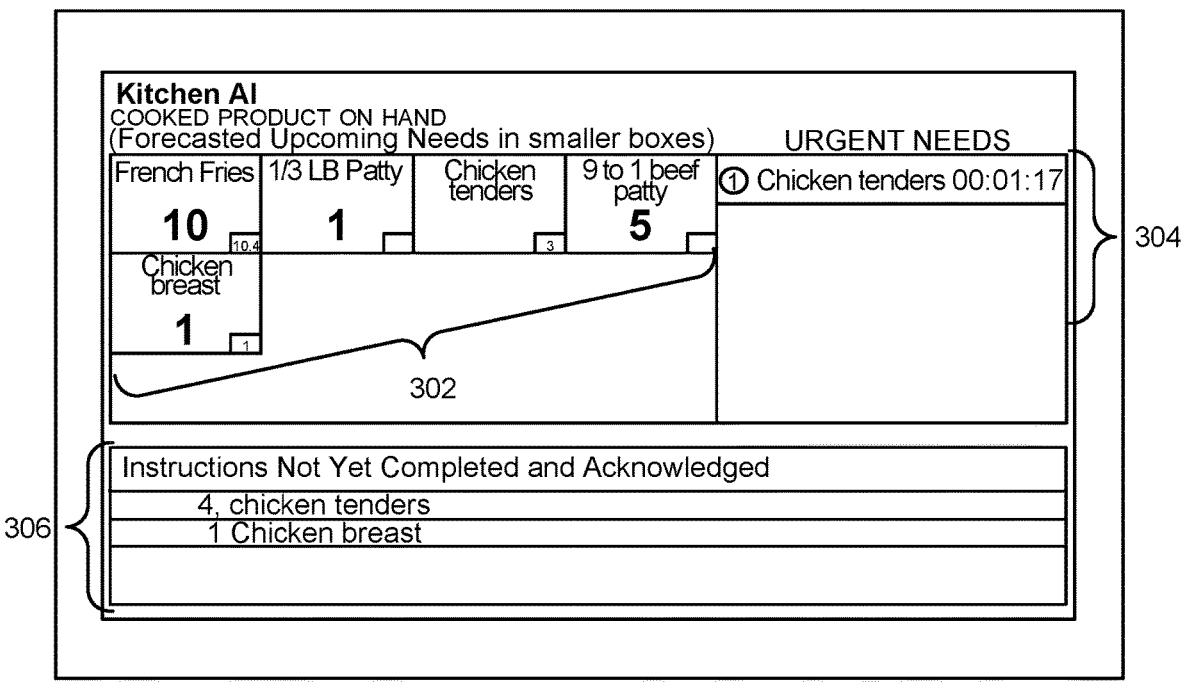
FIG. 3 is an example dashboard screen in a WAVE system.

Referring to FIG. 3, an example dashboard screen 300 in a WAVE system is shown. The example dashboard screen 300 includes a set of windows 302, which display forecasted items and ingredients with their present calculated on-hand cooked quantity. A set of windows 304 may display items that are required for orders and that have insufficient or no on-hand cooked product to satisfy. A set of windows 306 may display instructions not yet completed and acknowledged, which may be listed in chronological order.

The WAVE system may provide a method for the user to input and manage the various configuration parameters in a WAVE system Administration facility (Administrator facility). The Administrator facility can permit management of definitions for different groups of stores. This is especially of value in large restaurant chains that have different restaurant concepts (e.g., steakhouses and pizza parlors) or in chains where different stores are serviced by different product distribution centers that use different ingredient numbers. The Administrator facility may be designed to operate directly in each restaurant, or in a global facility that is "above the restaurant" (e.g., a restaurant corporate office). The Administrator facility may be developed as a client-server application or as a web-based application.

The Administrator facility may also be enabled to codify all user entered definitions into formats that are expected in the restaurant-resident system. In an implementation where the administration function is performed outside of the restaurant (e.g., in a restaurant corporate office), the Administrator facility may directly support the deployment of definition "packages" to applicable restaurants.

In one implementation of a client-server example of an Administrator facility, a tabbed single window in a display (not shown) permits the user to manage the restaurant information, the groups of restaurants, and it permits the user to deploy configuration data files to select restaurants or groups. This Administrator facility may validate all of the entered data to ensure that it falls within parameter limits and that destinations are reachable. This implementation assumes that system Configuration information is related to groups of stores ("Store Groups") rather than different configurations for every different specific restaurant. With this in mind, this example facility also permits the user to navigate to the configuration parameters that are specific to a particular "store group" by double-clicking the mouse on the particular row containing the "group" of interest.

The following table of data may be maintained, through some form of user interface, in an Administrator facility. The following table of data may be used in an interface that permits the maintenance of store "groups", along with assignment of a data repository location for the storage of WAVE data updates associated with each group. The table allows a user to add new Groups, delete Groups, and modify group information.

| Group Name | Parm File Destination or FTP Site | FTP UserID | FTP Password |
|---|---|---|---|
| Sample | c:\DeploytoStores | | |
| Restaurant Sample 2 | ftp_//16.0.1.35 | wavestore | wavePW |
| Restaurant Sample 3 | c:\RestaurantSample3 | | |

The following table may also be available in a user interface. The table can permit the addition, deletion, and modification of restaurants (stores) and their assignment or group association to particular store Groups. The table may also permit a restaurant to have an assigned data repository for storage of WAVE system data updates. If a restaurant-specific data repository location is defined, it can override the store Group repository in obtaining data updates destined for the particular store. When adding new restaurant-related data fields, a dropdown list of presently defined "Store Groups" may be presented to ensure that each restaurant is associated with a valid group. Also, upon entry of destination points that are to receive deployed packages, the facility may check the entered destination to ensure that it is reachable.

| Store ID | Store Name | Group Name | Parm File Destination or FTP Site | FTP UserID | FTP Password |
|---|---|---|---|---|---|
| 1 | City Store | Sample | | | |
| 2 | Country Store | Sample | ftp_//16.0.1.38 | wavestore | wavePW |
| 3 | Another Store | Sample | c:\TestStore | | |

The user may be permitted to deploy modified configuration parameters to all restaurants within a particular "Group" (new global updates) or it may deploy to only specific restaurants (new restaurant deployment or restaurant-specific problem corrections).

The same user interface may also present the following full tables of store Groups and specific restaurants. From the presented tables, the user may download WAVE system updates from a selection of different restaurant groups and specific restaurants. Such an interface may send data updates to all restaurants contained in the user-selected groups, and to the selected specific restaurants from the associated data repositories. The user interface may record the result status of each download attempt and return such information to the user upon completion of the deployment process. Upon completion of all deployment attempts, the interface may permit the user to re-attempt deployments that failed in the prior transmission attempts. There may be options for a user to select various download operations. For example, there may be checkboxes near the tables for a user to click on to download configuration settings or to download program updates.

| Group ID | Group Name | Parm File Destination or FTP Site |
|---|---|---|
| 1 | Sample | c:\DeploytoStores |
| 2 | Restaurant Sample 2 | ftp_//16.0.1.35 |
| 3 | Restaurant Sample 3 | c:\RestaurantSample3 |

| Store ID | Store Name | Group Name | Parm File Destination or FTP Site | Last Deployment |
|---|---|---|---|---|
| 1 | City Store | Sample | | |
| 2 | Country Store | Sample | ftp_//16.0.1.38 | wavestore |
| 3 | Another Store | Sample | c:\TestStore | |

The WAVE system data tables may be maintained in Administration tables and specific data may be associated with each different store Group. Such a user interface may permit the user to select any particular "Restaurant Group" row upon which the user may enter "Configuration Parameter Edit" mode with the parameter definitions that are specific to the selected group. With selection of a store Group, the interface may present the different KitchenAI data for updates (additions, deletions, changes) by the user.

One such table may be the following "Item and Recipe Product Definitions" table. The interface may permit the user to add new products (items and ingredients) to the configuration or to change the data fields associated with any existing products. Such item and ingredient definitions may establish that those particular items are to be managed in the KIMS for that particular store Group. The facility may validate the ingredient/item IDs against the known items/ingredients using associated data tables in a database. All of the other fields may be validated (e.g., stop time must be greater than start time) and the user may not be permitted to save their changes without first correcting all errors.

| Item Or Ingredient | Item or Prod ID | Item/Prod Name | Batch Size | Batch Name | Start Time | Stop Time | Hold Time | Build To | Pct Trigger | Cook Time |
|---|---|---|---|---|---|---|---|---|---|---|
| Ingredient | 71465 | French Fries | 32.72 | Basket of Fries | 11:00 | 16:00 | 7:00 | 80% | | 2:30 |
| Ingredient | 71465 | French Fries | 32.72 | Basket of Fries | 16:00 | 23:00 | 7:00 | 80% | | 2:30 |
| Item | 4623 | Large Fries | | | 4:00 | 23:00 | 7:00 | | | 2:30 |
| Item | 4684 | Medium Fries | | | 4:00 | 23:00 | 7:00 | | | 2:30 |
| Ingredient | 94385 | ⅓ LB Patty | | | | | | | | |
| Ingredient | 79053 | Chicken tenders | | | | | | | | |
| Ingredient | 59326 | Small Beef patty | | | | | | | | |
| Ingredient | 88215 | Chicken breast | | | | | | | | |
| Ingredient | 987654 | Chicken salad | 180 | Bowl of chick salad | | | 50:00:00 | | | 10:00 |
| Ingredient | 87654 | Chicken salad bowl | | | | | 50:00:00 | | | 10:00 |

The following tables may be used in an example user interface that may use fuzzy logic to permit the user to elect operational performance characteristics (e.g., forecasting method, limit waste vs. cooked ingredient availability, limit labor vs. ingredient availability, etc.) using non-technical preferences. In some implementations, the user interface may use slide bars to elect operational performance characteristics using non-technical preferences. For example, a user may use a slide bar in the interface to select a forecasting method ranging from a "use historical min," a "use historical average," to a "use historical max." In another example, a user may use a slide bar in the interface to select "limit waste vs. cooked ingredient availability" ranging from "limit waste" to "balance" to "high ingredient availability." In another example, a user may use a slide bar in the interface to select "limit labor vs. ingredient availability" ranging from "limit labor steps to" to "balance" to "high ingredient availability." The Administrator facility may use fuzzy logic to translate the layman non-technical preferences into a specific forecast method and system "limit" settings. Essentially, the interface may translate the user "goal" settings into appropriate numerical settings of associated parameters (specifically the ForecastMethod, BinPctThreshold and BuildTo settings).

This particular example assumes the use of WAVE technology to deliver voice directives to the cooks. As such, it requires entry of WAVE integration information (IP address, HTTP retry limits).

The configuration parameters also provide "default" item parameter settings. These settings are used by the system when the same parameters have not been defined at the product level. For example, for a particular restaurant concept, if the majority of products are fried and take 3:15 to cook and can be held for 15 minutes, then such can be defined as default parameters eliminating the need to duplicate the same information for every product that is defined.

The following tables may be presented to the user via an interface that permits updates. This particular user interface may permit direct assignment of both system configuration information (e.g., forecasting method, POS interface method, WAVE service IP address) and default item/ingredient values.

The following KIMS Operation Setup Parameters table is one example:

| Parameter Name | Parameter Value | Description and Rules |
|---|---|---|
| ForecastMethod | Average | Conservative, Average or Aggressive forecast (min, avg, max) |
| HourlyLaborRate | 16.25 | The average hourly pay rate of kitchen employees |
| MaxVoiceProducts | 3 | The maximum different products to cook in a single verbal directive |
| MaxVoiceQuantity | 12 | The maximum quantity for each product that will be requested for cooking |
| POSInterface | Native | POS Interface method (Native, StarPOS, xPient, Aloha) |
| StoreType | Wendys | The name of the restaurant |
| VoiceHostname | 16.0.1.35 | IP address of the WAVE server |
| VoiceRetryTimeout | 6000 | Number of milliseconds to wait for WAVE response |

The following Item Definition Default Parameters table:

| Parameter Name | Parameter Value | Description and Rules |
|---|---|---|
| BinPctThreshold | 0.5 | Percent of forecast available can drop to before cooking will be directed |
| BuildTo | 0.8 | Maximum percent of forecast that cooking will build to |
| CookTime | 03:15 | Default cook time |
| HoldTime | 15:00 | Default hold time |

The following "Wireless Active Voice Engine Parameters" table of data elements comprise the WAVE operational parameters. This data may be presented to the usere via a user interface that permits changes to the assigned values. Such an interface may validate user changes to ensure that they are acceptable values. The interface may then permit saving all associated changes into the parameter data files associated with the selected restaurant Group.

| Parameter Name | Value | Parameter Description |
|---|---|---|
| Coaching | TRUE | Coaching to be used (TRUE) or not to be used (FALSE) |

-continued

| Parameter Name | Value | Parameter Description |
|---|---|---|
| CoachIntervalMins | 30 | # minutes between providing performance feedback to cooks |
| CountThreshhold | 5 | # of poor OK performance when overall perf considered poor |
| Feeder_channel | A1 | WAVE Channel dedicated to cook instructions |
| Manager_channel | A2 | WAVE Channel dedicated to Manager instructions |
| PrimaryLanguage | English | English, Spanish or French |
| SecondaryLanguage | French | English, Spanish or French |
| SecsToOKThreshhold | 45 | # seconds for cook OK response to be considered reasonable |
| ServicePort | 8008 | IP Port used by WAVE |
| Sound_type | Shure | Type of voice system (Shure or HME) |
| StatsIntervalMins | 15 | Number of minutes between reporting worker statistics |

The disclosed technology may also be configured to provide restaurant "Food Prep" instructions at various times through the day. A "Food Prep" task involves preparing products or condiments in large batches that typically have a relatively long lifespan and are used in conjunction with other food products in creating restaurant items. Examples of such are slicing tomatoes, slicing onions, frying bacon, proofing biscuits, thawing hamburger patties, etc.

The Food Prep tasks are specifically defined in the system for each applicable product/task and contain a "Start time" when the preparation should occur and a "Hold time" for each prep product. These product-specific start/hold times determine the forecast horizon that is to be used in determining the quantity of product that must be prepped. For each different product, multiple preparation times can be defined for the day. As an example, slicing of tomatoes may be defined in the system as follows:

| Prep Task | Start Time | Hold Time |
|---|---|---|
| Slice tomatoes | 06:00 a.m. | 10 hours |
| Slice tomatoes | 02:00 p.m. | 10 hours |

With the definitions above, at 6:00 a.m., the disclosed technology can forecast the quantity of sliced tomatoes that will be needed for the 10-hour period starting at 6:00 a.m. and ending at 4:00 p.m. Corresponding instructions may be delivered to the restaurant kitchen for the associated food prep (e.g., Food prep task . . . slice 13 tomatoes). The disclosed technology can then track the actual sliced tomato use and resulting on-hand quantity throughout the day. At 2:00 p.m. The disclosed technology may forecast the quantity of sliced tomatoes that will be needed for the 10-hour period starting at 2:00 p.m. and ending at midnight. The disclosed technology may then subtract the current on-hand quantity of sliced tomatoes from the forecasted needs to determine the amount of product that must be prepped. Corresponding instructions may be delivered to the restaurant kitchen for the associated food prep.

The disclosed technology includes a WAVE server that provides rapid information delivery via an http service software interface that can reside either on a locally hosted server or on a web server that is located on the internet and uses hardware that provides an interface with wireless voice facilities and user controls (e.g., buttons). Messages are delivered via verbal speech to a recipient through text-to-speech conversion that is performed by the WAVE server.

In some implementations, the WAVE software service ("WAVE software service") is called from application programs or via computer commands that specify the following data elements that are used by the WAVE server to deliver information to an appropriate recipient:

text representation of a voice directive to be delivered to a targeted recipient (e.g., "cook 10 beef patties");

the targeted recipient that receives the message; and determination of whether active acknowledgement of message receipt and corresponding recipient action is required or if the directive is to be delivered passively (no user acknowledgement is required). If "active" acknowledgement is requested, the WAVE system will not provide a return result to the calling facility until after the recipient acknowledges receipt/action.

The WAVE implementation may interface with various on-premise wireless voice systems (e.g., an HME wireless system, Shure wireless headset system, etc.) or it may use dedicated wireless headsets that are not used for other purposes. WAVE hardware may also deliver voice commands via Bluetooth to compatible user headset units. WAVE hardware may be configured with a speaker that can deliver commands without a wireless audio headset system or in addition to the wireless system.

In some implementations, the WAVE hardware may provide a user interface via interface input buttons. The interface input buttons can be directly wired to the WAVE hardware or they may also be wireless using Bluetooth technology or otherwise. The interface input buttons permit the voice recipient to actively interact with the WAVE system. The following three interface input buttons, by way of example, with other possible input buttons, may be acted on by the WAVE system:

"OK"—The OK interface input button is pressed by the recipient to indicate that the last voice directive was received and an act performed responsive to the received directive. Otherwise, if an "active" voice directive is delivered to the recipient, until the recipient presses the "OK" button, the WAVE system will periodically deliver an audible beep to the recipient's headset as notification that the WAVE hardware is awaiting an acknowledgement of receipt and action.

"Repeat"—The Repeat interface input button is pressed by the recipient to have the most recent or last voice directive repeated by the WAVE hardware, for example, if the recipient did not hear a prior command.

"Language"—The Language button input is pressed by the recipient to toggle the verbal instruction language between a "primary" language (e.g., English) and a "secondary" language (e.g., Spanish). If the secondary language is selected by the recipient, the WAVE system will translate the voice directive into the secondary language using a language translation table before delivering the voice command to the recipient in the secondary language.

As an alternative to interface input buttons, in one implementation, a user may instead use voice recognition for acknowledgements. For example, a limited vocabulary of user responses may be used, namely, "OK", "Repeat", and specific languages (e.g., "English", "Spanish", "French", etc.). In another example, a more expansive vocabulary may be available.

In one voice recognition implementation, a voice activation button may be incorporated. The WAVE system begins a voice recognition cycle when a user pushes the voice activation button. If a key word is not recognized in a specified timeframe (e.g., 15 seconds), the WAVE system may notify the recipient that no key word is recognized. In one implementation, rather than use of a voice activation button, the WAVE system may be in a constant listening mode awaiting recognition of a key word.

In some implementations, the WAVE hardware may provide an interface or other general screen and an input mechanism whereby the unit may be manipulated and controlled. The screen may display the present state of the unit (e.g., waiting for user acknowledgement, Idle, Rebooting, etc.). An input mechanism may permit a user to initiate various actions on the WAVE system such as "Restart", "Register Headset", "Shutdown", etc.). The elected input mechanism may be a button switch 128 in FIG. 1.

With particular wireless headset systems such as the HME Restaurant Wireless Headset system, the WAVE system permits itself to be "registered" as a headset with the master HME base station. This permits the WAVE system to be easily installed and configured with existing restaurant wireless headset systems. The registration is performed via a WAVE user input device on WAVE hardware.

In some implementations, the WAVE system may be configured to provide user coaching via system configuration parameters. The WAVE system may provide configuration of an expected average response acknowledgement turnaround time and a time interval with which coaching should be provided to the recipient. With active (versus passive) voice commands, the WAVE system may log the amount of time between a directive and user acknowledgement. The WAVE system may then determine the average acknowledgement turnaround time for the time interval and consequently deliver appropriate coaching feedback to the user. The coaching feedback may be generalized to vary through various feedback messages such as "great job," "you are doing good in keeping up," "good work" when objectives are met and various feedback messages such as "you need to speed up a bit" and "you are falling behind" when the objectives are not met.

In some implementations, the WAVE system may provide logging of each voice directive received from any calling facilities and for voice commands requiring "active acknowledgement." The WAVE system may also log the response time for each associated recipient directive acknowledgements. A log may be subsequently used to analyze overall performance of the WAVE system and of the specific users of the WAVE system.

In a quick service restaurant, a desired configuration of the disclosed technology may be a configuration that executes software with a wireless system that is separate from any existing in-store wireless systems (e.g., drive-through headsets). In such implementation, a WAVE system incorporates an "always on" wireless headset system (e.g., wireless headset systems used by concert band performers, units specialized for the restaurant industry).

In one implementation, a single channel (single user) WAVE system may be extended to a multi-user configuration by introducing a second wireless base station and additional electronics that switch an audio signal between base units depending on the user being targeted for each message.

Figure 4:
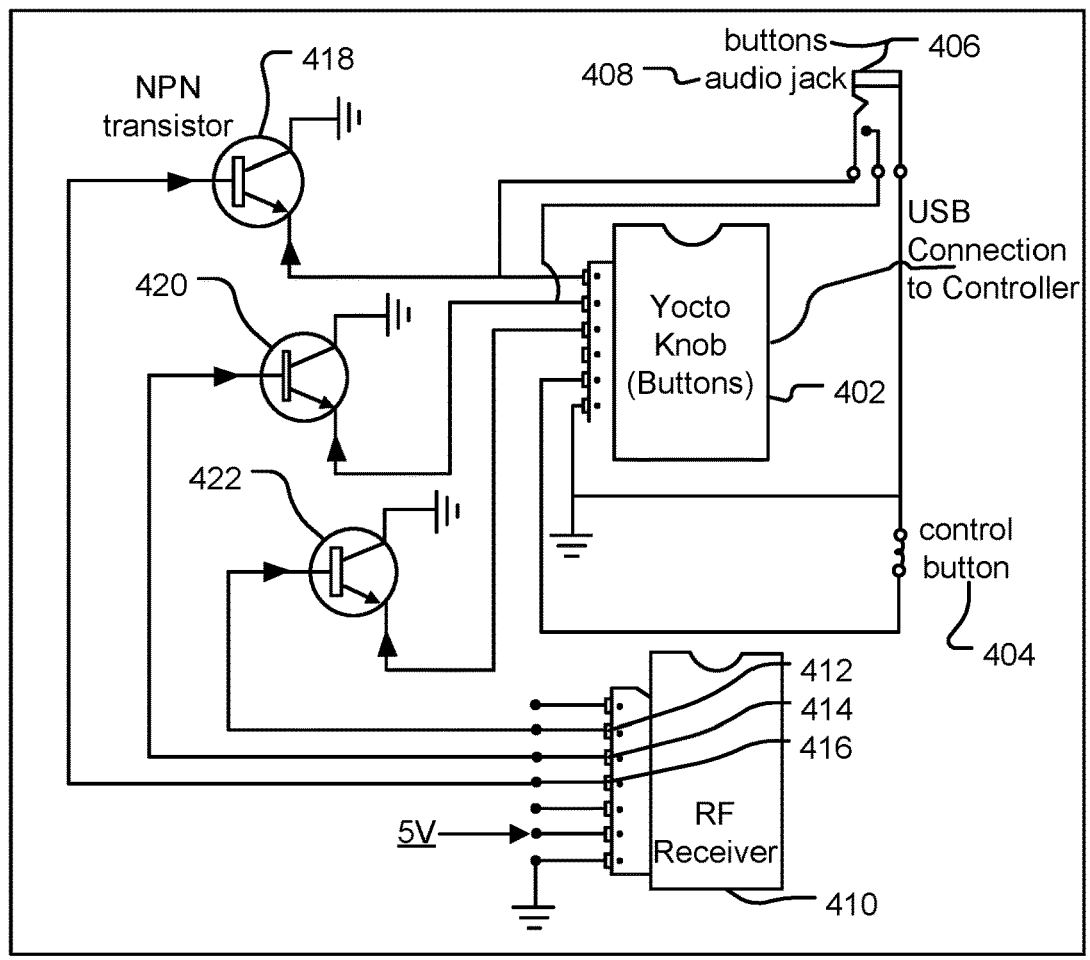
FIG. 4 is a schematic diagram of an example circuit in a WAVE system.

Referring to FIG. 4, a schematic diagram of an electronic circuit 400 in a WAVE system is shown. FIG. 4 shows an example circuit 400 that may be used to convey switch or button input to the WAVE controller. A USB input 402 provides button and switch input to the WAVE controller through a USB connection. The USB input 402 may receive inputs from both wired and wireless buttons and switches.

In the implementation shown in FIG. 4, the USB input 402 is a device that interfaces electrical switch values (open/closed) to a PC. The USB input 402 includes five switch input connections that are capable of reading inputs from connected physical buttons or physical switches. The circuit 400 includes a control button 404 directly connected to an input pin of the USB input 402. Buttons 406 and an audio jack 408 are also directly connected to inputs of the USB input 402. For example, when the button 406 is depressed, the USB input 402 receives an input at the input pin corresponding to the button 406. The USB input 402 can then communicate to the WAVE controller that the button 406 has been depressed. Similarly, a remote RF button can be pressed to activate contact 416 of the RF Receiver 410. In this electronic configuration, an RF button or the physical button may be interchangeably used to signal the same switch closed status. In other implementations, other physical buttons, physical switches, or physical potentiometers may be connected directly to the USB input 402 through inputs to the USB input 402.

The USB input 402 is also capable of reading inputs from connected wireless buttons or wireless switches through an RF receiver 410. The RF receiver 410 receives signals from wireless buttons (not shown) and outputs signals through output pins 412, 414, and 416. In the implementation shown in FIG. 4, the RF receiver 410 is capable of receiving wireless signal input from three wireless buttons. When one of the wireless buttons is depressed, the wireless button sends a corresponding signal to the RF receiver 410. The RF receiver 410 then produces a signal from a corresponding output pin of the RF receiver 410. The output pins 412, 414, and 416 of the RF receiver 410 corresponding to the wireless buttons are connected to the USB input 402 through NPN transistors 418, 420, and 422.

For example, when the button corresponding to the output pin 412 of the RF receiver 410 is depressed, the RF receiver 410 receives a signal corresponding to that button. For example, a different identifier may be sent to the RF receiver 410 for each button. When the RF receiver 410 receives the signal corresponding to the wireless button corresponding to the output pin 412 of the RF receiver 410, the RF receiver 410 outputs a signal or voltage through the output pin 412. The signal or voltage reaches the NPN transistor 418 and is then transmitted to the USB input 402. The USB input 402 then communicates that the wireless button was depressed to the WAVE controller. In other implementations, an RF receiver 410 may include more output pins, and, accordingly, may be able to receive input from more than three wireless buttons. The RF receiver 410 may also receive wireless signals from other wireless components.

Figure 5:
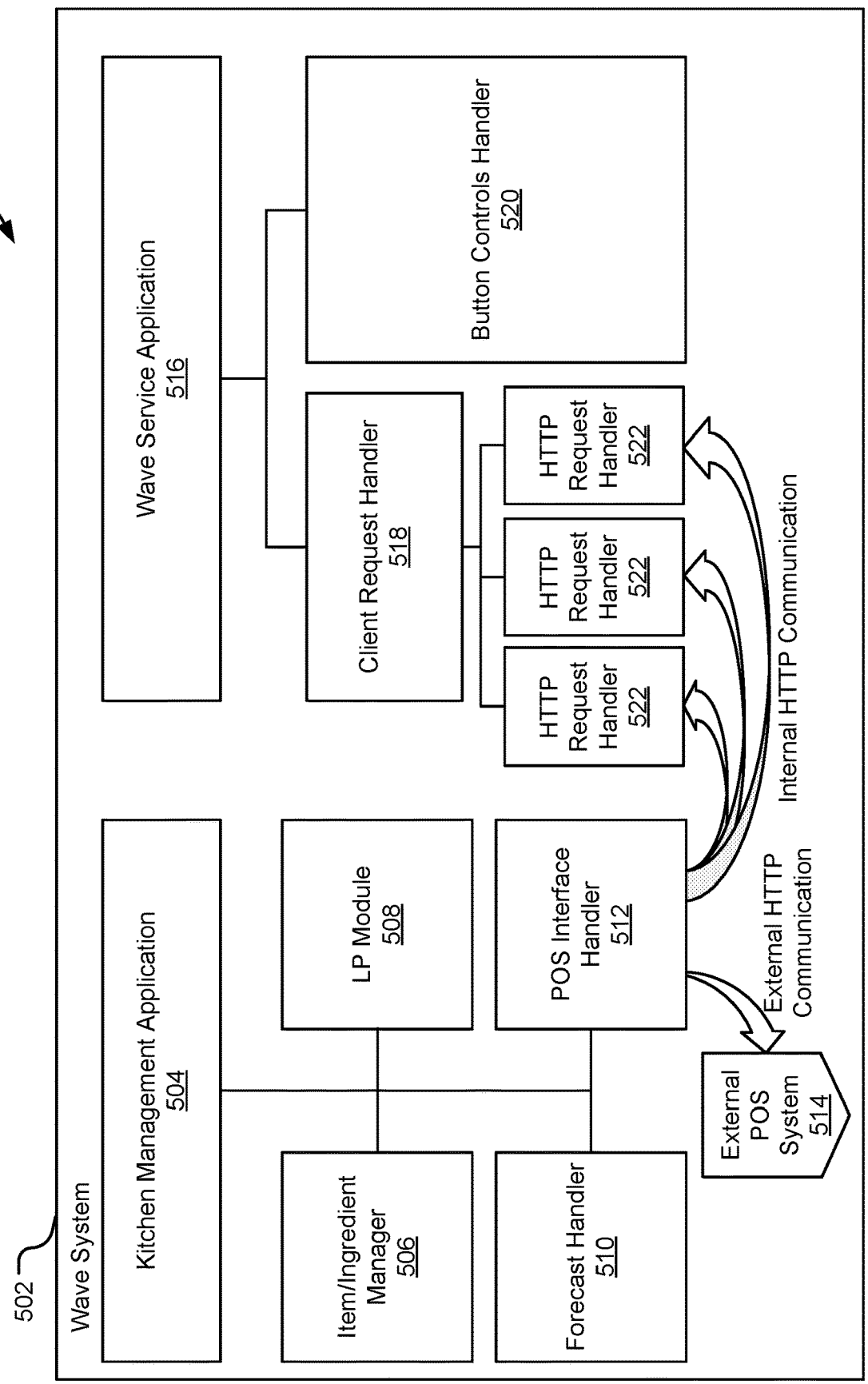
FIG. 5 is a schematic diagram of an example WAVE software application.

Referring to FIG. 5, a schematic diagram of an example WAVE software application in a WAVE system 500 is shown. The WAVE software application in the WAVE system 500 may be used to drive the hardware as described in FIG. 1 and may be a multi-threaded software application.

In FIG. 5, a WAVE System 502 is shown with various software components. A Kitchen Management Application 504 reads configuration parameters and initializes a KIMS system (not shown). The Kitchen Management Application 504 instantiates instances of each of the KIMS modules (e.g., an Item/Ingredient Manager 506, an LP Module 508, a Forecast Handler 510, and a POS Interface Handler 512.)

The Forecast Handler 510 computes forecasted demand for passed items and ingredients and passed timeframe. A POS Interface Handler 512 establishes an HTTP Listener for POS requests, responses and protocol management. The POS Interface Handler 512 has external HTTP communication with an external POS System 514.

A WAVE Service Application 516 reads configuration parameters into a generally accessible class, instantiates and starts a Button Controls Handler 520 thread, and instantiates the Client Request Handler 518. The Client Request Handler 518 creates an HTTP Listener to read Kitchen Management Application 504 requests on the port that is designated in the configuration file. For each client request received, the Client Request Handler 518 creates new HTTP Request Handlers 522 and passes the newly received request to HTTP Request Handlers 522 for servicing. The HTTP Request Handlers 522 accept HTTP Requests, handle HTTP protocol and responses, and conduct internal HTTP communication with the POS Interface Handler 512.

The Button Controls Handler 520 accesses and initializes control button state information according to configuration parameters. The Button Controls Handler 520 then enters a continuous loop, constantly checking current button states (pressed or not pressed), and stores the state into a global class that is accessible to the Kitchen Management Application 504. The Button Controls Handler 520 directly act on "Master" button presses with the system control button.

In one implementation, one thread manages the interaction with the client (calling) HTTP requests through a main HTTP Listener which creates a separate handler thread to handle each specific client request. The second main thread manages interaction with the user via the button controls.

Figure 6:
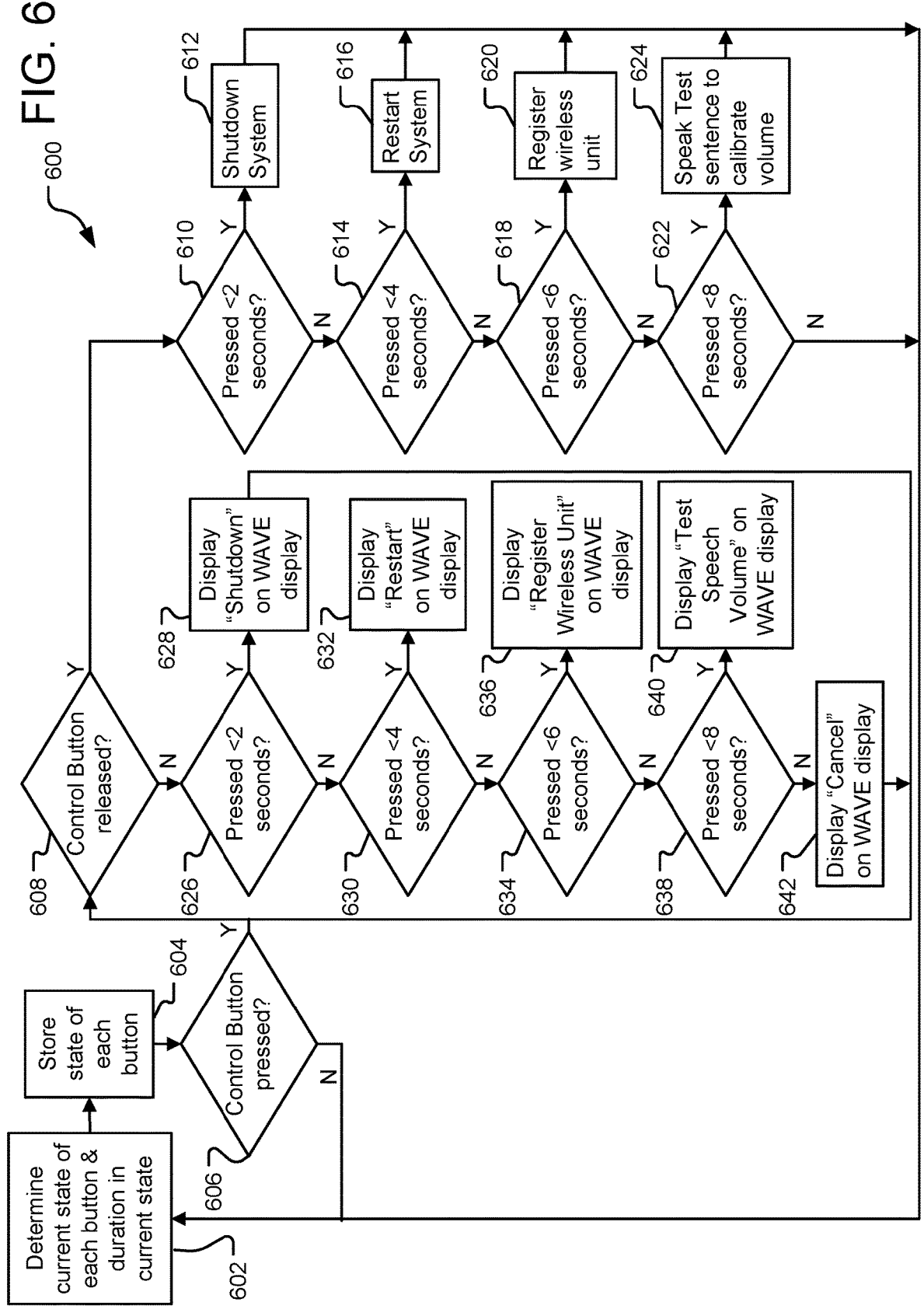
FIG. 6 is a flowchart of example operations in a WAVE system.

Referring to FIG. 6, a flowchart of example operations 600 in a WAVE system are shown. In this implementation, a Button Controls Handler thread enters a continuous loop that monitors the state of the user interface input buttons and records their state. The button states are stored into a generally accessible "Class" such that the present state of buttons may be easily referenced by the Client Request Handler logic and by the Kitchen Management Application 504. The presented logic also monitors a Master button and performs direct actions based on the duration of the Master button being pressed. The Button Controls Handler may use the following logic flow as shown in FIG. 6.

Specifically, an operation 602 determine a current state of each button and the duration in a current state. An operation 604 store the state of each button. An operation 606 determines whether a control button (e.g., button 128 in FIG. 1) is pressed. If the control button is not pressed, then operation 602 repeats. If the control button is pressed, then an operation 608 determines whether the control button is released. If the control button is released, then an operation 610 determines if the control button was pressed less than 2 seconds. If the control button was pressed less than 2 seconds, an operation 612 shuts down the WAVE system.

If the control button was not pressed less than 2 seconds, an operation 614 determines whether the control button was pressed for less than 4 seconds. If the control button was pressed less than 4 seconds, an operation 616 restarts the WAVE system.

If the control button was not pressed less than 4 seconds, an operation 618 determines whether the control button was pressed for less than 6 seconds. If the control button was pressed less than 6 seconds, an operation 620 registers a wireless unit.

If the control button was not pressed less than 6 seconds, an operation 622 determines whether the control button was pressed for less than 8 seconds. If the control button was pressed less than 8 seconds, an operation 624 performs a Speak Test sentence to calibrate the volume. If the control button was not pressed less than 8 seconds, operation 602 occurs.

The Client Request Handler 518 in FIG. 5 is the direct interface for all client application requests. Client requests are sent to the WAVE system in a JSON formatted request. A sample JSON formatted client message in this sample implementation may be:

HTTP://WAVE:8008/
KIMS?Target=cook&ACK=Yes&Message=Cook 10 hamburger patties where,
the specific service being requested is "KIMS",
the targeted user to receive the voice message is "cook" (the system may be configured to deliver speech messages to multiple distinct targets),
"ACK=Yes" specifies that the user may acknowledge that they have received the verbal message by pressing an "OK" button,
the "Message= . . . " presents the text message that the WAVE system is to convert to speech and deliver to the target recipient.

A main HTTP thread reads all such client requests and validates the content of the JSON formatted message request. If the request command or the formatting of the request is invalid, then the system immediately returns "NAK" to the calling client.

If the client request passes all validation tests, the system creates a new thread to handle the conversion of the text message to speech and to then deliver the speech to the target user by playing the speech through the processor speaker port that is interfaced to the WAVE hardware unit. This main HTTP thread logic is a continuous loop described in FIG. 6.

Figure 7:
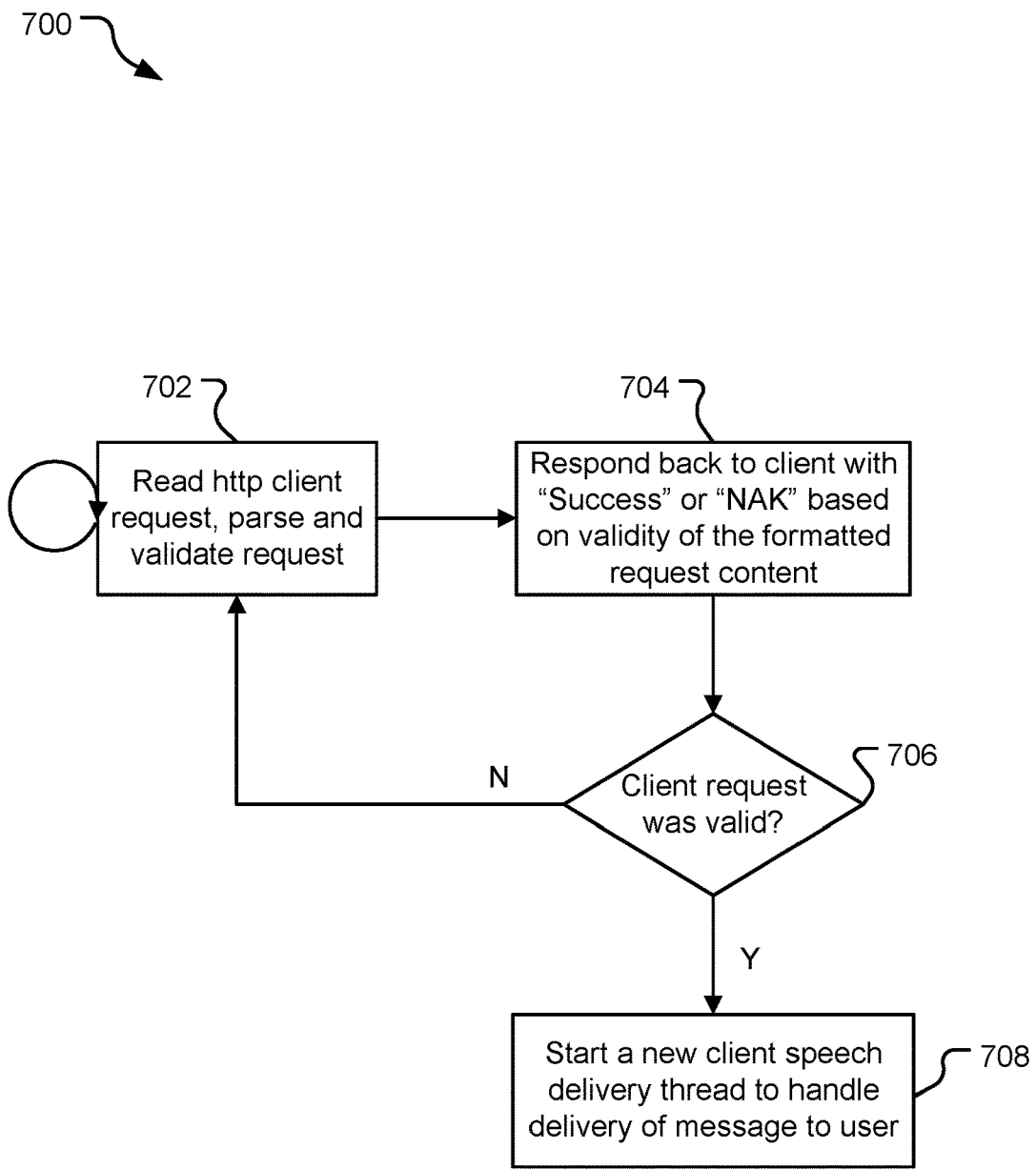
FIG. 7 is a flowchart of example operations in a WAVE system.

Referring to FIG. 7, a flowchart of example operations 700 in a WAVE system are shown. This is an event-based process that must read the actual request (sent by a POS system), determine whether the request is of proper format and content (validate the request), and immediately respond back to the POS so that its own process is not delayed. If the request is valid (proper format and proper content), then a new process thread is created to handle the actual request and this process returns to wait for a next http client request.

An operation 702 reads a http client request, parse and validate request. In some implementations, the operation may be continuously repeated. An operation 704 responds back to the client with "success" or "NAK" based on validity of the formatted request content.

An operation 706 determines whether the client request is valid. If the client request is valid, then an operation 708 starts a new client speech delivery thread to handle delivery of a message to the user and the process returns to operation 702 to read a next http client request. If the client request is not valid, then the process disregards the message and loops back to operation 702.

Figure 8:
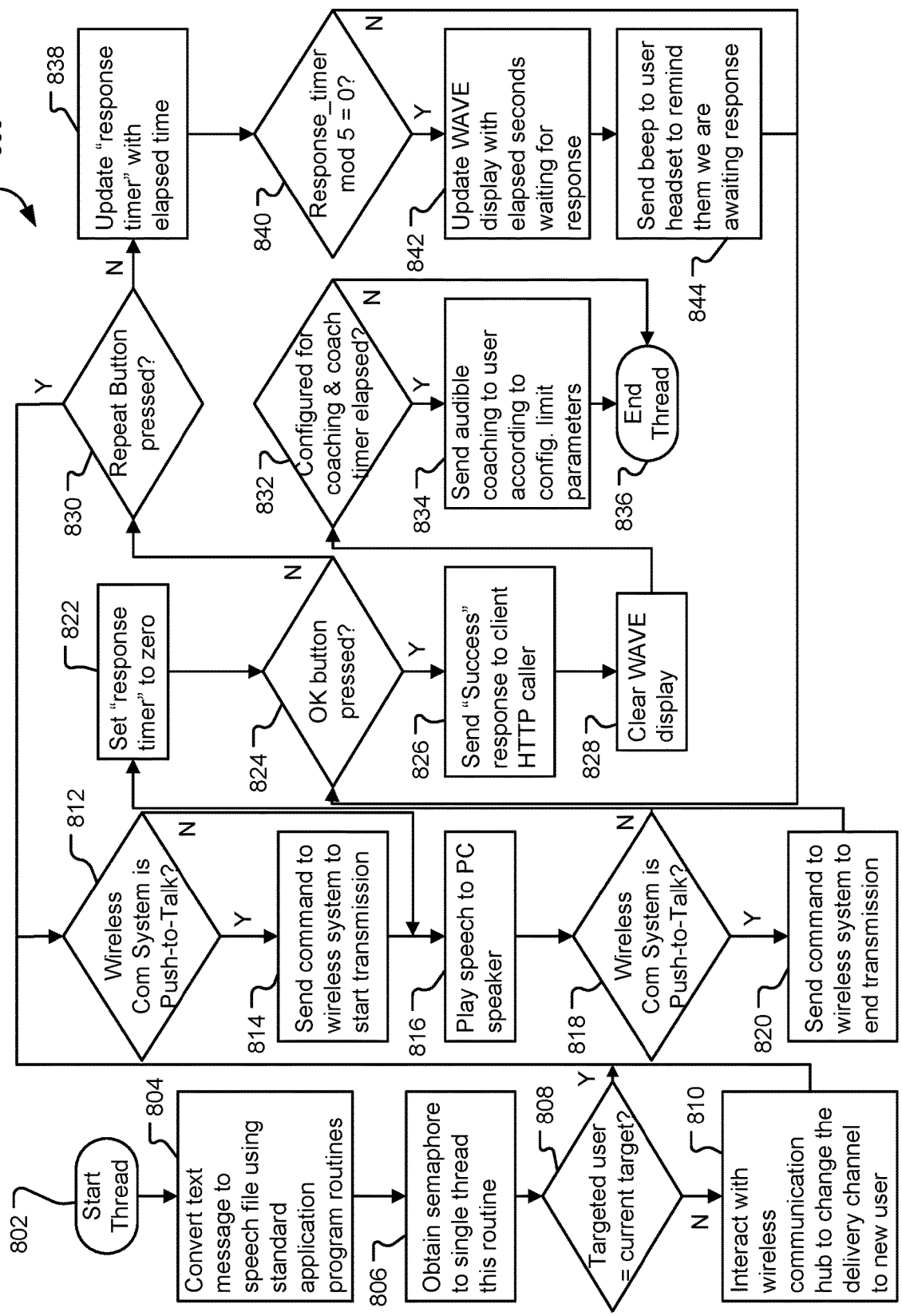
FIG. 8 is a flowchart of example operations in a WAVE system.

Referring to FIG. 8, a flowchart of example operations 800 in a WAVE system are shown. A Voice Delivery Thread first performs the text-to-speech conversion. Included within the conversion are routines that maximize the audio volume of the resulting speech audio output while eliminating audio "clipping", an audio defect that occurs whenever the volume of audio exceeds the maximum value permitted in a particular audio-encoding scheme.

As wireless communication devices are generally single-threaded (e.g., can only work with one recipient or group at a time), the thread secures a semaphore that ensures that only one thread is sending voice messages and interacting with a user at any given point in time. Once the application semaphore is available, the thread will deliver the voice message to the user. Upon delivery (and if necessary, the user has acknowledged the message by pressing an "OK" button), this thread then relinquishes the semaphore and it responds "Success" back to the client.

Specifically, an operation 802 starts the thread. An operation 804 converts text message to a speech file using standard application program routines. An operation 806 obtains a system semaphore to cause single threading of its operation.

An operation 808 determines whether the user that has been designated to receive a KIMS voice directive (e.g., a targeted user") is the same or different recipient to which the most recent last voice directive was delivered (e.g., a current target). If the operation 808 determines the targeted user is not a current target, then operation 810 interacts with a wireless communication hub to change the delivery channel to a new user and the process progresses to operation 812. If operation 808 determines that the targeted user is the same as the current target, then the process progresses directly to operation 812.

If an operation 812 determines the wireless com system uses push-to-talk devices, an operation 814 sends a command to a wireless system to start a transmission (i.e., simulate a "push"). Then, an operation 816 plays speech to a PC speaker. If the operation 812 determines the wireless com system is not push-to-talk, the operation 816 occurs immediately.

After operation 816, an operation 818 determines whether a wireless com system is push-to-talk. If the operation 812 determines the wireless com system is push-to-talk, an operation 820 sends a command to a wireless system to end the transmission (i.e., terminate simulation of button "push"). Then, an operation 822 sets a response timer to zero. If the operation 818 determines the wireless com system is not push-to-talk, the operation 822 occurs immediately.

After operation 822, an operation 824 determines whether the OK button is pressed. If the OK button is pressed, an operation 826 send a "Success" response to a client HTTP caller. Then, an operation 828 clears a WAVE display.

If the OK button is not pressed, an operation 830 determines whether a repeat button is pressed. If the repeat button is pressed, then process returns to operation 812 so that the voice directive is again delivered to the targeted recipient.

If the repeat button is not pressed, then operation 838 updates a "response timer" with elapsed time. An operation 840 determines whether if the duration of wait is on a 5-second interval using the mathematics modulo operator. If a 5-second interval has been reached (e.g., 5 seconds, 10 seconds, 15 seconds, etc.), an operation 842 updates a WAVE display with elapsed seconds waiting for a response. An operation 844 sends a notification (e.g., a beep or other audio noise) to a user headset to remind the user that they have not yet responded by pressing their "OK" button. The process then loops back to operation 824 while awaiting the "OK" button press. If a 5 second time interval has not been reached, then the process loops back to operation 824 immediately.

Figure 9:
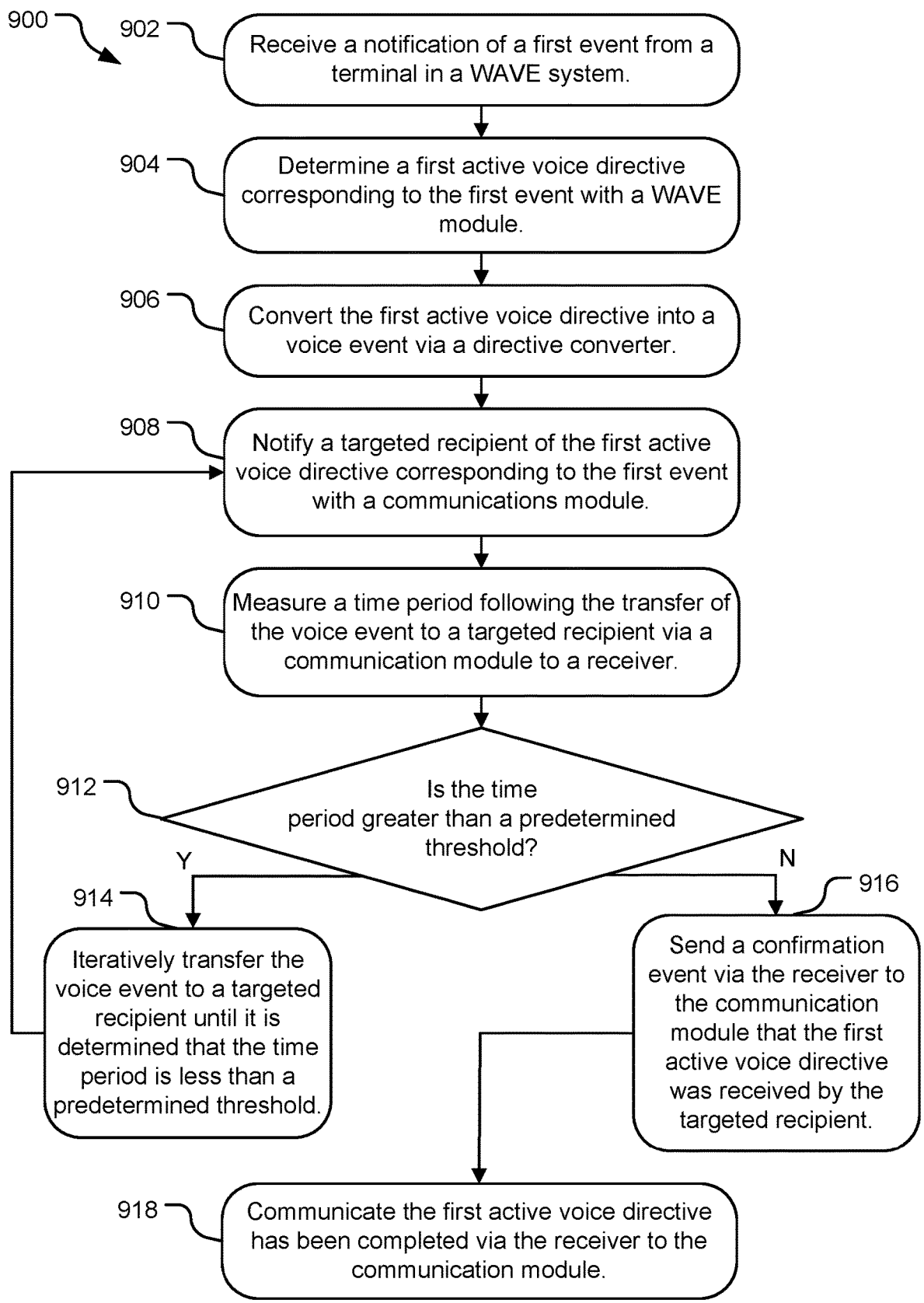
FIG. 9 is a flowchart of example operations in a WAVE system.

Referring to FIG. 9, a flowchart of example operations 900 in a WAVE system are shown. An operation 902 receives a notification of a first event from a terminal in a WAVE system. An operation 904 determines a first active voice directive corresponding to the first event with a WAVE module. An "active" voice directive requires an acknowledgement from the user when each instruction is delivered. The WAVE module may determine a first active voice directive based on product factors.

An operation 906 converts the first active voice directive into a voice event via a directive converter. The first active voice directive may be converted into a voice event through text to speech conversion. An operation 908 notifies a targeted recipient of the first active voice directive corresponding to the first event with a communications module.

An operation 910 measures a time period following the transfer of the voice event to a targeted recipient via a communications module to a receiver.

An operation 912 determines whether the time period is greater than a predetermined threshold, such as a predetermined performance threshold. If the time period is greater than a predetermined threshold, either an operation 914 iteratively transfer the voice event to a targeted recipient until it is determined that the time period is less than a predetermined threshold.

If the time period is less than a predetermined threshold, an operation 910 sends a confirmation event via the receiver to the communications module that the first active voice directive was received by the targeted recipient. An operation 912 communicates the first active voice directive has been completed via the receiver to the communications module. In some implementations, a coaching event may be communicated.

Figure 10:
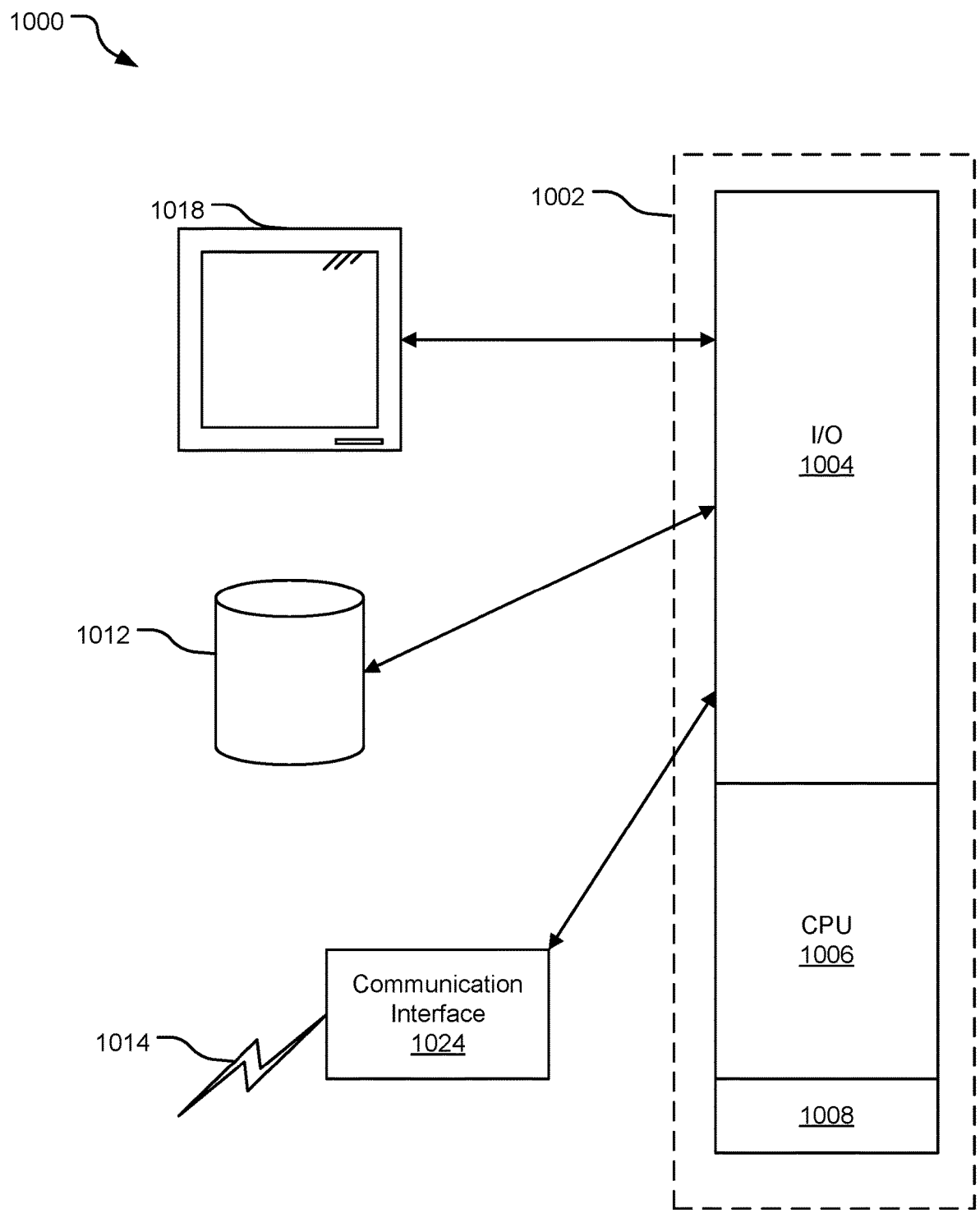
FIG. 10 illustrates a block diagram of a computer system in a WAVE system.

FIG. 10 discloses a block diagram of a computer system 1000 suitable for implementing the cooking management system technology, including WAVE systems, disclosed herein. The computer system 1000 is capable of executing a computer program product embodied in a tangible computer-readable storage medium to execute a computer process. The tangible computer-readable storage medium is not embodied in a carrier-wave or other signal. Data and program files may be input to computer system 100, which reads the files and executes the programs therein using one or more processors. Some of the elements of a computer system are shown in FIG. 10, where a processor 1002 is shown having an input/output (I/O) section 1004, a Central Processing Unit (CPU) 1006, and a memory 1008. There may be one or more processors 1002, such that processor in WAVE unit 102 of system 100 has a single central-processing unit or a plurality of processing units. The computer system 1000 further includes a controller, not shown in FIG. 10, configured to designate a plurality of non-contiguous storage areas on the storage media; the controller may be software, firmware, or a combination thereof. The system 1000 may be a conventional computer, a distributed computer, or any other type of computer. The described technology is optionally implemented in software loaded in memory 1008, a disc storage unit 1012, and/or communicated via a wired or wireless network link 1014 on a carrier signal (e.g., Ethernet, 3G wireless, 5G wireless, LTE (Long Term Evolution)) thereby transforming the computing system 1000 in FIG. 10 to a special purpose machine for implementing the described operations.

A communication interface 1024 is capable of connecting the computer system 1000 to an enterprise network via the network link 1014, through which the computer system can receive instructions and data embodied in a carrier wave. When used in a local area networking (LAN) environment, the computing system 1000 is connected (by wired connection or wirelessly) to a local network through the communication interface 1024, which is one type of communications device. When used in a wide-area-networking (WAN) environment, the computing system 1000 typically includes a modem, a network adapter, or any other type of communications device for establishing communications over the wide area network. In a networked environment, program modules depicted relative to the computing system 1000 or portions thereof, may be stored in a remote memory storage device. It is appreciated that the network connections shown are examples of communications devices for and other means of establishing a communications link between the computers may be used.

In an example implementation, the cooking management WAVE system technology methods may be embodied by instructions stored in memory 1008 and/or disc storage unit 1012 and executed by the processor 1002. Further, local computing system, remote data sources and/or services, and other associated logic represent firmware, hardware, and/or software which may be configured to adaptively distribute workload tasks to improve system performance. The use of the media may be implemented using a general purpose computer and specialized software (such as a server executing service software), and a special purpose computing system and specialized software (such as a mobile device or network appliance executing service software), or other computing configurations. In addition, program data, such as dynamic allocation threshold requirements and other information may be stored in memory 1008 and/or disc storage unit 1012 and executed by processor 1002.

The implementations of the disclosed technology described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the disclosed technology. Accordingly, the logical operations making up the implementations of the disclosed technology described herein are referred to variously as operations, steps, objects, or modules. Furthermore, it should be understood that logical operations may be performed in any order, adding and omitting as desired, unless explicitly claimed otherwise or a specific order is inherently necessitated by the claim language.

The above specification, examples, and data provide a complete description of the structure and use of exemplary implementations of the disclosed technology. The above description provides specific implementations. It is to be understood that other implementations are contemplated and may be made without departing from the scope or spirit of the present disclosure. The above detailed description, therefore, is not to be taken in a limiting sense. While the present disclosure is not so limited, an appreciation of various aspects of the disclosure will be gained through a discussion of the examples provided.

What is claimed is:

1. A cooking management method comprising:
   receiving a notification of a first cooking management event from a terminal in a wireless voice engine system;
   selecting a first voice instruction from a set of possible voice instructions, the first voice instruction corresponding to the first cooking management event;
   delivering the first voice instruction corresponding to the first cooking management event with a communications module to a targeted recipient; and
   receiving a confirmation event that the first voice instruction was received by the targeted recipient.

2. The cooking management method of claim 1, wherein the delivering operation comprises:
   converting the first voice instruction into a voice event via an instruction converter; and
   transferring the first voice instruction as the voice event to the targeted recipient via the communications module.

3. The cooking management method of claim 1, wherein the confirmation event indicates one or more acknowledgments to the wireless voice engine system, the one or more acknowledgments being selected by the targeted recipient.

4. The cooking management method of claim 3, wherein at least one of the one or more acknowledgments indicates that the first voice instruction was received by the targeted recipient and further characterizes an agreement and understanding of the first voice instruction by the targeted recipient.

5. The cooking management method of claim 1, further comprising:
   measuring a duration of an elapsed time period following delivery of the first voice instruction as a voice event to the targeted recipient via the communications module; and
   determining whether the duration of the elapsed time period is greater than a predetermined performance threshold.

6. The cooking management method of claim 5, further comprising:
   communicating a coaching event responsive to determining that the duration of the elapsed time period is less than the predetermined performance threshold.

7. The cooking management method of claim 5, further comprising:
   communicating that there was no confirmation that the voice event was transferred to the targeted recipient responsive to determining that the elapsed time period is greater than the predetermined performance threshold.

8. The cooking management method of claim 7, further comprising:
   iteratively transferring the voice event to the targeted recipient responsive to determining that the elapsed time period is greater than the predetermined performance threshold until there is confirmation that the voice event was transferred to the targeted recipient.

9. A cooking management wireless voice engine system comprising:
   one or more processors;
   a wireless voice engine module executable by the one or more processors and configured to receive a notification of a first cooking management event from a terminal in a wireless voice engine system and to select a first voice instruction from a set of possible voice instructions, the first voice instruction corresponding to the first cooking management event; and
   a communications module executable by the one or more processors and configured to deliver the first voice instruction corresponding to the first cooking management event to a targeted recipient and to receive a confirmation event that the first voice instruction was received by the targeted recipient.

10. The cooking management wireless voice engine system of claim 9, further comprising:
    a management module executable by the one or more processors and configured to iteratively select from the set of possible voice instructions.

11. The cooking management wireless voice engine system of claim 10, wherein the first voice instruction is selected based on a plurality of product factors including at least one of current forecasted customer demand, presently available cooked product, cook times of different products, and product hold times.

12. The cooking management wireless voice engine system of claim 9, wherein receiving the confirmation event further comprises:
  indicating one or more acknowledgments to the wireless voice engine system, the one or more acknowledgments being selected by the targeted recipient and wherein at least one of the one or more acknowledgments indicates that the first voice instruction was received by the targeted recipient and further characterizes an agreement and understanding of the first voice instruction by the targeted recipient.

13. One or more tangible computer readable storage media encoding computer-executable instructions for executing on a computer system a computer process for cooking management, the computer process comprising:
  receiving a notification of a first cooking management event from a terminal in a wireless voice engine system;
  selecting a first voice instruction from a set of possible voice instructions, the first voice instruction corresponding to the first cooking management event;
  delivering the first voice instruction corresponding to the first cooking management event with a communications module to a targeted recipient; and
  receiving a confirmation event that the first voice instruction was received by the targeted recipient.

14. The one or more tangible computer readable storage media of claim 13, wherein the delivering operation comprises:
  converting the first voice instruction into a voice event via an instruction converter; and
  transferring the first voice instruction as the voice event to the targeted recipient via the communications module.

15. The one or more tangible computer readable storage media of claim 13, wherein the confirmation event indicates one or more acknowledgments to the wireless voice engine system, the one or more acknowledgments being selected by the targeted recipient.

16. The one or more tangible computer readable storage media of claim 15, wherein at least one of the one or more acknowledgments indicates that the first voice instruction was received by the targeted recipient and further characterizes an agreement and understanding of the first voice instruction by the targeted recipient.

17. The one or more tangible computer readable storage media of claim 13, wherein the computer process further comprises:
  measuring a duration of an elapsed time period following delivery of the first voice instruction as a voice event to the targeted recipient via the communications module; and
  determining whether the duration of the elapsed time period is greater than a predetermined performance threshold.

18. The one or more tangible computer readable storage media of claim 17, wherein the computer process further comprises:
  communicating a coaching event responsive to determining whether the duration of the elapsed time period is less than the predetermined performance threshold.

19. The one or more tangible computer readable storage media of claim 17, wherein the computer process further comprises:
  communicating that there was no confirmation that the voice event was transferred to the targeted recipient responsive to determining that the elapsed time period is greater than the predetermined performance threshold.

20. The one or more tangible computer readable storage media of claim 19, wherein the computer process further comprises:
  iteratively transferring the voice event to the targeted recipient responsive to determining that the elapsed time period is greater than the predetermined performance threshold until there is confirmation that the voice event was transferred to the targeted recipient.

* * * * *